(12) United States Patent  
Matsuba

(10) Patent No.: US 8,879,097 B2  
(45) Date of Patent: Nov. 4, 2014

(54) PRINTING DEVICE FOR PRINTING A DOCUMENT TO BE PASSED TO ONE OR MORE RECIPIENTS, PRINTING SYSTEM, CONTROL METHOD, AND COMPUTER-READABLE STORAGE MEDIUM FOR CONTROL PROGRAM

(75) Inventor: Takafumi Matsuba, Takarazuka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 196 days.

(21) Appl. No.: 13/323,042

(22) Filed: Dec. 12, 2011

(65) Prior Publication Data

US 2012/0147423 A1     Jun. 14, 2012

(30) Foreign Application Priority Data

Dec. 13, 2010    (JP) ................................ 2010-276807

(51) Int. Cl.
*G06K 15/02*     (2006.01)
*H04N 1/00*     (2006.01)
*H04N 1/32*     (2006.01)

(52) U.S. Cl.
CPC ....... *H04N 1/00127* (2013.01); *H04N 1/32545* (2013.01); *H04N 1/32502* (2013.01); *H04N 2201/3202* (2013.01); *H04N 1/32101* (2013.01); *H04N 1/00395* (2013.01)
USPC ........................................................ 358/1.15

(58) Field of Classification Search
USPC ........................................................ 358/1.15
See application file for complete search history.

(56) References Cited

U.S. PATENT DOCUMENTS

| 8,107,095 | B2 | 1/2012 | Kawafuji |
| 2003/0217201 | A1 | 11/2003 | Gargi et al. |
| 2006/0250631 | A1 | 11/2006 | Igarashi |
| 2008/0112010 | A1 | 5/2008 | Matsuo |
| 2009/0251729 | A1 | 10/2009 | Nakawaki |
| 2012/0019866 | A1* | 1/2012 | Kuroshima ................. 358/1.15 |

FOREIGN PATENT DOCUMENTS

| JP | 10-154120 A | 6/1998 |
| JP | 2003-108350 A | 4/2003 |
| JP | 2003-208299 A | 7/2003 |
| JP | 2006-146662 A | 6/2006 |
| JP | 2006-313494 A | 11/2006 |
| JP | 2008-217192 A | 9/2008 |

OTHER PUBLICATIONS

Machine translation for JP 2003-208299, IDS.*
The extended European Search Report dated Apr. 3, 2012, issued in corresponding European Patent Application No. 11191700.1. (8 pages).
Japanese Office Action (Notification of Reason(s) for Refusal) dated Oct. 16, 2012, issued in corresponding Japanese Patent Application No. 2010-276807, and English language translation of Office Action. (8 pages).
Office Action (Decision to Grant a Patent) dated May 21, 2013, issued by the Japanese Patent Office in the corresponding Japanese patent Application No. 2010-276807 and an English translation thereof. (6 pages).

* cited by examiner

*Primary Examiner* — Qian Yang

(74) *Attorney, Agent, or Firm* — Buchanan Ingersoll & Rooney PC

(57) ABSTRACT

A printing device is provided which prints a document, to be passed to one or more recipients, in an output format according to a personal preference of each of the recipients. The printing device includes a receiving portion configured to accept a print job indicating the document and the recipients; a determination portion configured to determine an output format according to a personal preference of each of the recipients indicated in the accepted print job based on a history of print jobs that were executed for each of the recipients, and a print job execution portion configured to, when printing the document indicated in the accepted print job by a plurality of sets corresponding to the number of the recipients, perform the printing in the output format according to the personal preference of each of the recipients determined by the determination portion.

15 Claims, 31 Drawing Sheets

FIG. 5

RUL

| MANAGEMENT NUMBER | USER NAME | EXPLICIT SETTING |
|---|---|---|
| 00001 | TANAKA | NO |
| 00002 | YAMADA | NO |
| 00003 | SATOH | NO |
| 00004 | SUZUKI | YES |
| 00005 | YAMAMOTO | YES |
| ⋮ | ⋮ | ⋮ |

FIG. 6

JHL

| MANAGEMENT NUMBER | USER NAME | PAPER SIZE | COLOR SETTINGS | PAGE LAYOUT | OUTPUT SURFACE | FILE TYPE | DATE/TIME |
|---|---|---|---|---|---|---|---|
| | JHL1 | JHL2 | | | | JHL3 | JHL4 |
| 00001 | TANAKA | A4 | FULL COLOR | NO | ONE SURFACE | AAA | 2010/11/1 10:00 |
| 00002 | YAMADA | A4 | MONOCHROME | 2 in 1 | BOTH SURFACES | AAA | 2010/11/2 10:00 |
| 00003 | YAMADA | A4 | MONOCHROME | 2 in 1 | BOTH SURFACES | AAA | 2010/11/2 11:00 |
| 00004 | SUZUKI | A3 | FULL COLOR | NO | ONE SURFACE | BBB | 2010/11/4 9:00 |
| 00005 | TANAKA | A4 | FULL COLOR | 2 in 1 | BOTH SURFACES | CCC | 2010/11/4 10:00 |
| 00006 | SATOH | A3 | MONOCHROME | NO | ONE SURFACE | BBB | 2010/11/5 13:00 |
| 00007 | YAMAMOTO | A4 | MONOCHROME | NO | BOTH SURFACES | CCC | 2010/11/5 14:00 |
| 00008 | YAMAMOTO | A4 | MONOCHROME | NO | BOTH SURFACES | CCC | 2010/11/5 15:00 |
| 00009 | TANAKA | A4 | FULL COLOR | NO | ONE SURFACE | AAA | 2010/11/5 16:00 |
| ... | ... | ... | ... | ... | ... | ... | ... |

| VARIABLE DATA PRINTING (PERSONALIZED LAYOUT PRINTING) |
|---|

SELECT TARGET USERS          TARGET USERS

G2a — DIRECT ENTRY / [ ] ADD

TARGET USERS list (G2d): TANAKA, YAMADA, SUZUKI

G2b — SELECT FROM AMONG USERS REGISTERED IN MFP/AUTHENTICATION DEVICE
TANAKA
YAMADA
SATOH
SUZUKI
YAMAMOTO
REFERENCE
ADD

G2c — SELECT FROM FILE
C:¥MERGE PRINTING¥RECIPIENT.csv   REFERENCE
TANAKA
YAMADA
SATOH
SUZUKI
YAMAMOTO
ADD

OK  CANCEL

FIG. 9

TUL

| REGISTRATION NUMBER | TARGET USER NAME |
|---|---|
| 00001 | TANAKA |
| 00002 | YAMADA |
| 00003 | SUZUKI |

FIG. 11

PJD

```
%-12345X@PJL JOB
@PJL COMMENT
@PJL SET USERNAME = "matsuba"
@PJL SET KMCOETYPE = 2
@PJL SET DRIVERJOBID = "ACDE4800537B0B0801330500CB"
@PJL SET STRINGCODESET = UTF8
@PJL SET BITSPERPIXEL = 8
@PJL SET RESOLUTION = 600
@PJL SET JOBNAME = "Microsoft Word - Format_JP2009.doc"
@PJL SET KMDRIVER = ON
@PJL SET HOLD = OFF
@PJL SET BOXHOLDTYPE = PRIVATE
@PJL SET KMCERTSELECTTYPE = FLEX
@PJL SET KMOUTPUTTYPE = Variable
@PJL SET KMCOPYS = 3
@PJL SET KMADDRESS_USER_NAME =
tanaka,yamada,suzuki
•
•
•
```

FIG. 13A

| MANAGEMENT NUMBER | USER NAME | PAPER SIZE | COLOR SETTINGS | PAGE LAYOUT | OUTPUT SURFACE | FILE TYPE | DATE/TIME |
|---|---|---|---|---|---|---|---|
| 00001 | TANAKA | A4 | FULL COLOR | NO | ONE SURFACE | AAA | 2010/11/1 10:00 |
| 00005 | TANAKA | A4 | FULL COLOR | NO | ONE SURFACE | AAA | 2010/11/4 9:00 |
| 00011 | TANAKA | A3 | MONOCHROME | 2 in 1 | BOTH SURFACES | AAA | 2010/11/6 13:00 |
| 00015 | TANAKA | A4 | MONOCHROME | NO | ONE SURFACE | CCC | 2010/11/6 15:00 |
| 00021 | TANAKA | A3 | FULL COLOR | 2 in 1 | BOTH SURFACES | BBB | 2010/11/7 17:00 |
| 00025 | TANAKA | A4 | MONOCHROME | 2 in 1 | ONE SURFACE | AAA | 2010/11/8 17:00 |
| 00031 | TANAKA | A3 | MONOCHROME | 2 in 1 | BOTH SURFACES | AAA | 2010/11/10 9:00 |

FIG. 13B

| MANAGEMENT NUMBER | USER NAME | PAPER SIZE | COLOR SETTINGS | PAGE LAYOUT | OUTPUT SURFACE | FILE TYPE | DATE/TIME |
|---|---|---|---|---|---|---|---|
| 00001 | TANAKA | A4 | FULL COLOR | NO | ONE SURFACE | AAA | 2010/11/1 10:00 |
| 00005 | TANAKA | A4 | FULL COLOR | NO | ONE SURFACE | AAA | 2010/11/4 9:00 |
| 00011 | TANAKA | A3 | MONOCHROME | 2 in 1 | BOTH SURFACES | AAA | 2010/11/6 13:00 |
| 00025 | TANAKA | A4 | MONOCHROME | 2 in 1 | ONE SURFACE | AAA | 2010/11/8 17:00 |
| 00031 | TANAKA | A3 | MONOCHROME | 2 in 1 | BOTH SURFACES | AAA | 2010/11/10 9:00 |

FIG. 14A

| MANAGEMENT NUMBER | USER NAME | PAPER SIZE | COLOR SETTINGS | PAGE LAYOUT | OUTPUT SURFACE | FILE TYPE | DATE/TIME | |
|---|---|---|---|---|---|---|---|---|
| 00001 | TANAKA | A4 | FULL COLOR | NO | ONE SURFACE | AAA | 2010/11/1 10:00 | } GROUP1 |
| 00005 | TANAKA | A4 | FULL COLOR | NO | ONE SURFACE | AAA | 2010/11/4 9:00 | |
| 00011 | TANAKA | A3 | MONOCHROME | 2 in 1 | BOTH SURFACES | AAA | 2010/11/6 13:00 | } GROUP2 |
| 00031 | TANAKA | A3 | MONOCHROME | 2 in 1 | BOTH SURFACES | AAA | 2010/11/10 9:00 | |
| 00025 | TANAKA | A4 | MONOCHROME | 2 in 1 | ONE SURFACE | AAA | 2010/11/8 17:00 | } GROUP3 |

FIG. 14B

| MANAGEMENT NUMBER | USER NAME | PAPER SIZE | COLOR SETTINGS | PAGE LAYOUT | OUTPUT SURFACE | FILE TYPE | DATE/TIME | |
|---|---|---|---|---|---|---|---|---|
| 00011 | TANAKA | A3 | MONOCHROME | 2 in 1 | BOTH SURFACES | AAA | 2010/11/6 13:00 | ⎫ GROUP2 |
| 00031 | TANAKA | A3 | MONOCHROME | 2 in 1 | BOTH SURFACES | AAA | 2010/11/10 9:00 | ⎭ |
| 00001 | TANAKA | A4 | FULL COLOR | NO | ONE SURFACE | AAA | 2010/11/1 10:00 | ⎫ GROUP1 |
| 00005 | TANAKA | A4 | FULL COLOR | NO | ONE SURFACE | AAA | 2010/11/4 9:00 | ⎭ |
| 00025 | TANAKA | A4 | MONOCHROME | 2 in 1 | ONE SURFACE | AAA | 2010/11/8 17:00 | } GROUP3 |

FIG. 16

PFL

| REGISTRATION NUMBER | TARGET USER NAME | PAPER SIZE | COLOR SETTINGS | PAGE LAYOUT | OUTPUT SURFACE |
|---|---|---|---|---|---|
| 00001 | TANAKA | A3 | MONOCHROME | 2 in 1 | BOTH SURFACES |
| 00002 | YAMADA | A4 | MONOCHROME | 2 in 1 | BOTH SURFACES |
| 00003 | SUZUKI | A3 | FULL COLOR | NO | ONE SURFACE |

PJD´3

OUTPUT FORMAT
ONE SURFACE, NO,
FULL COLOR, A3

OUTPUT CONTENT

⋮

PRINTING DEVICE FOR PRINTING A DOCUMENT TO BE PASSED TO ONE OR MORE RECIPIENTS, PRINTING SYSTEM, CONTROL METHOD, AND COMPUTER-READABLE STORAGE MEDIUM FOR CONTROL PROGRAM

This application is based on Japanese patent application No. 2010-276807 filed on Dec. 13, 2010, the contents of which are hereby incorporated by reference.

BACKGROUND OF THE INVENTION

1. Field of the Invention

The present invention relates to a printing device configured to print one or more sets of documents to be distributed to one or more recipients in output formats according to their personal preferences, and so on.

2. Description of the Related Art

Printing devices have recently attained widespread use for printing the result of an output from a computer, and the like onto a recording medium such as paper.

Such a printing device is called, for example, a "printer", and is connected to a computer via a network such as a dedicated cable or a LAN. A printing device connectable via a network is called a "network printer" or the like.

A printing device having a variety of functions, such as copying, scanning, faxing, and a document server function, in addition to a printing function, is called, for example, a "multifunction device", "Multi-Functional Peripheral (MFP)".

For performing various types of printing using such a printing device, a user can designate an output format (printing conditions) including a print layout such as an output paper size, a print side of paper, the number of pages laid out on one surface of paper, and a print color mode.

In general, a user has his/her own preferred output format that he/she uses regularly, and tends to be unfamiliar with a printed matter produced in the other output formats.

Preferences for output formats vary from user to user. For example, some users like "2-in-1" printing through which a two-page document is printed on a single side of paper because the number of output sheets is small. Other users do not like such "2-in-1" printing because letters printed onto paper are too small to be legible. Further, some users like "double-sided printing" through which printing is performed on both sides of output paper because the paper surfaces are effectively used. Other users do not like such "double-sided printing" because the printed matter forces them to turn over the output paper for reading, which is troublesome.

For printing a document only for private use, a user designates an output format based on his/her own preference.

Sometimes, a user prints a plurality of sets of documents for the purpose of distributing the sets of documents to attendees, for example, at a meeting. Stated differently, the user sometimes prints a plurality of sets of documents for readers not including himself/herself.

In such a case, the user often does not grasp readers' personal preferences for output formats, which makes it difficult for the user to select output formats reflecting the readers' personal preferences. Even if the user grasps the readers' personal preferences for output formats, the user is required to select, for each set, an output format according to a reader's personal preference for a case where the user prints a plurality of sets of documents for a plurality of readers. Such a task is burdensome for the user.

To cope with this, there has been proposed a printing device in which individual users register their personal preferences for output formats in advance, and, when print data is sent from a sender to the users, each user (recipient) can print out a document in an output format reflecting his/her own preference (Japanese Laid-open Patent Publication No. 2003-208299).

According to the printing device described in Japanese Laid-open Patent Publication No. 2003-208299, individual readers can obtain printed matters in output formats reflecting their own preferences. In order to do this, however, the readers need to register, in advance, their personal preferences for output formats in the printing device, which is troublesome. In addition, it is the reader himself/herself who is required to perform print output operation, which means that a user forces the reader to perform the print output operation.

SUMMARY

The present disclosure is directed to solve the problems pointed out above, and therefore, an object of an embodiment of the present invention is to provide a printing device capable of printing a document based on an output format reflecting reader's own preference without putting a burden on the reader.

A printing device according to an aspect of the present invention is a printing device for printing a document, to be passed to one or more recipients, in an output format according to a personal preference of each of the recipients. The printing device includes a receiving portion configured to accept a print job indicating the document and the recipients, a determination portion configured to determine an output format according to a personal preference of each of the recipients indicated in the accepted print job based on a history of print jobs that were executed for each of the recipients, and a print job execution portion configured to, when printing the document indicated in the accepted print job by a plurality of sets corresponding to the number of the recipients, perform the printing in the output format according to the personal preference of each of the recipients determined by the determination portion.

These and other characteristics and objects of the present invention will become more apparent by the following descriptions of preferred embodiments with reference to drawings.

BRIEF DESCRIPTION OF THE DRAWINGS

FIG. 5 is a diagram showing an example of a registered user list.

FIG. 6 is a diagram showing an example of a job history list.

FIG. 8 is a diagram showing an example of a target user setting screen.

FIG. 9 is a diagram showing an example of a target user list.

FIG. 11 is a diagram showing an example of actual print job data.

FIGS. 13A and 13B are diagrams showing an example of the process of extraction or sort of a print job record.

FIGS. 14A and 14B are diagrams showing an example of the process of extraction or sort of a print job record.

FIG. 16 is a diagram showing an example of an output format list.

DESCRIPTION OF THE PREFERRED EMBODIMENTS

First Embodiment

Figure 1:
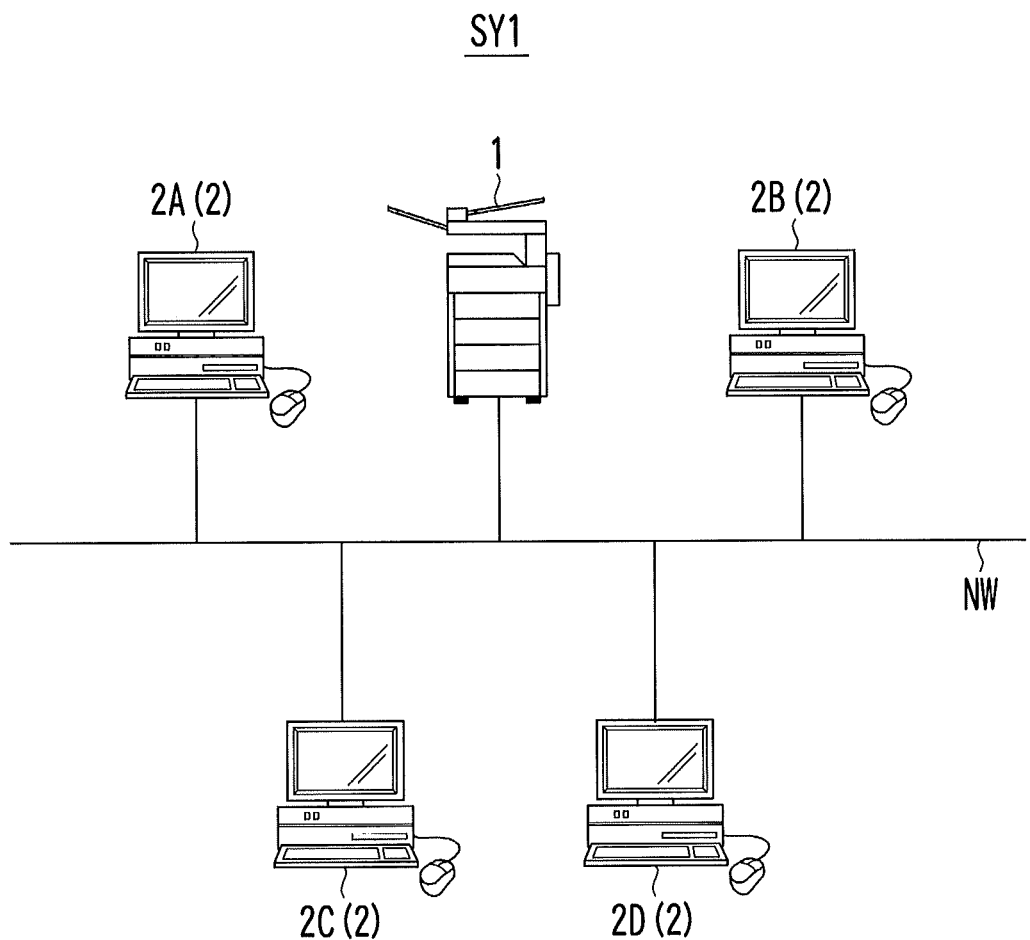
FIG. 1 is a diagram showing an example of a printing system according to a first embodiment.

FIG. 1 is a diagram showing an example of a printing system SY1 according to the first embodiment.

As shown in FIG. 1, the printing system SY1 is configured of a printing device 1 and print requesting devices 2A through 2D that are connected to one another via a network NW. Hereinafter, the print requesting devices 2A through 2D may be collectively denoted by reference numeral 2.

The printing device 1 is operable to receive print data from the print requesting device 2 via the network NW and to print an image based on the received print data onto output paper, or the like. In the illustrated example, the printing device 1 is shown as a "multifunction device" or a "Multi-Functional Peripheral (MFP)" which has a variety of functions, such as copying, scanning, faxing, and a document server function in addition to a network function and a printing function. Such a device serving as the printing device 1 needs at least the network function and the printing function.

The print requesting device 2 is a device for a user to create a document file by using document creation software, and to request the printing device 1 to perform printing based on the details of the created document file. The print requesting device 2 is, for example, a personal computer.

The network NW is a communication line for enabling communication between information processing devices connected thereto, namely, is a so-called Local Area Network (LAN).

Figure 2:
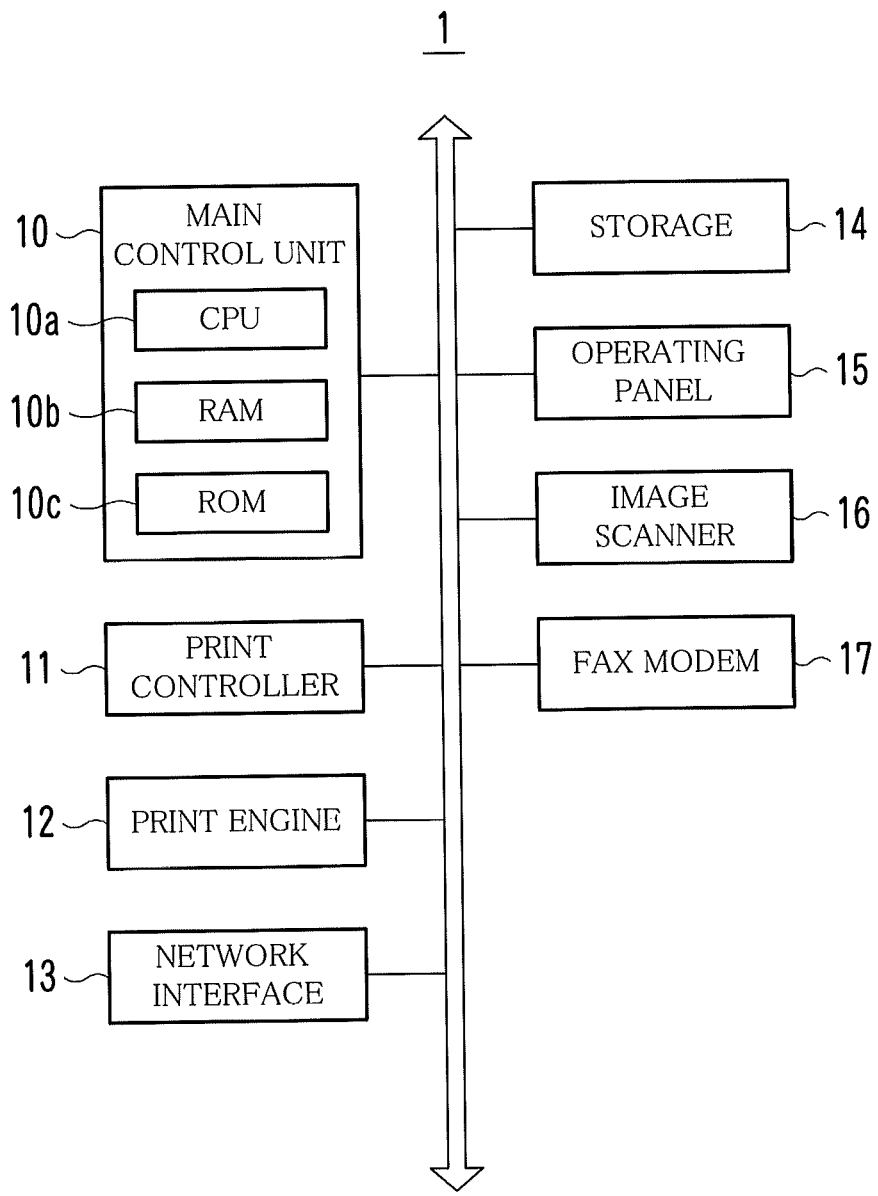
FIG. 2 is a diagram showing an example of the hardware configuration of a printing device.

FIG. 2 is a diagram showing an example of the hardware configuration of the printing device 1.

Referring to FIG. 2, the printing device 1 is configured of a main control unit 10, a print controller 11, a print engine 12, a network interface 13, a storage 14, an operating panel 15, an image scanner 16, a FAX modem 17, and so on. Since the minimum required functions of the printing device 1 are the network function and the printing function as described above, the operating panel 15, the image scanner 16, and the FAX modem 17 are not essential elements thereof.

The main control unit 10 is configured of a Central Processing Unit (CPU) 10a, a Random Access Memory (RAM) 10b, a Read Only Memory (ROM) 10c, and so on. The main control unit 10 provides a centralized control of the printing device 1 based on programs and data stored in the ROM 10c or the storage 14, and on data inputted through the network interface 13.

The print controller 11 is operable to analyze print data that is received from another information processing device via a network such as the LAN, or from an internal device of the main control unit 10, and is described in a printer language (PDL: Page Description Language), and to generate image data serving as a print target.

The print engine 12 is implemented by using an electrophotographic print mechanism, an inkjet print mechanism, or a thermal transfer print mechanism. The print engine 12 serves to print a monochrome (grayscale) image or a color image onto one side or both sides of output paper based on image data generated by the print controller 11, or image data generated by the image scanner 16.

The network interface 13 serves to send and receive data with other information processing devices via a network such as the LAN. A communication protocol, e.g., Transmission Control Protocol/Internet Protocol (TCP/IP) is used for sending and receiving data.

The storage 14 is a non-volatile storage device for retaining data stored therein even when no power is supplied. An example of the storage 14 is a magnetic storage device such as a Hard Disk Drive (HDD) or a semiconductor memory such as a Solid State Drive (SSD) and a flash memory.

The operating panel 15 is provided with a touch-sensitive panel display, a variety of operation switches, and so on. The operating panel 15 is operable to display many screens for a user, and to accept various operation from the user.

The image scanner 16 is provided with a light source, an image sensor, and so on. The image scanner 16 is a device that optically captures an image such as a character, chart, and symbol depicted on paper to create image data thereof.

The FAX modem 17 serves to send and receive data with other FAX machines via a public line. For sending and receiving data, a FAX protocol such as G3 is used.

The print requesting device 2 is configured of a main control unit 20 (see FIG. 4) including a CPU, a RAM, and a ROM, a non-volatile storage device, a display device, an inputting device such as a keyboard and a pointing device, a network interface for sending and receiving data with other information processing devices via a network such as a LAN, and so on.

Figure 3:
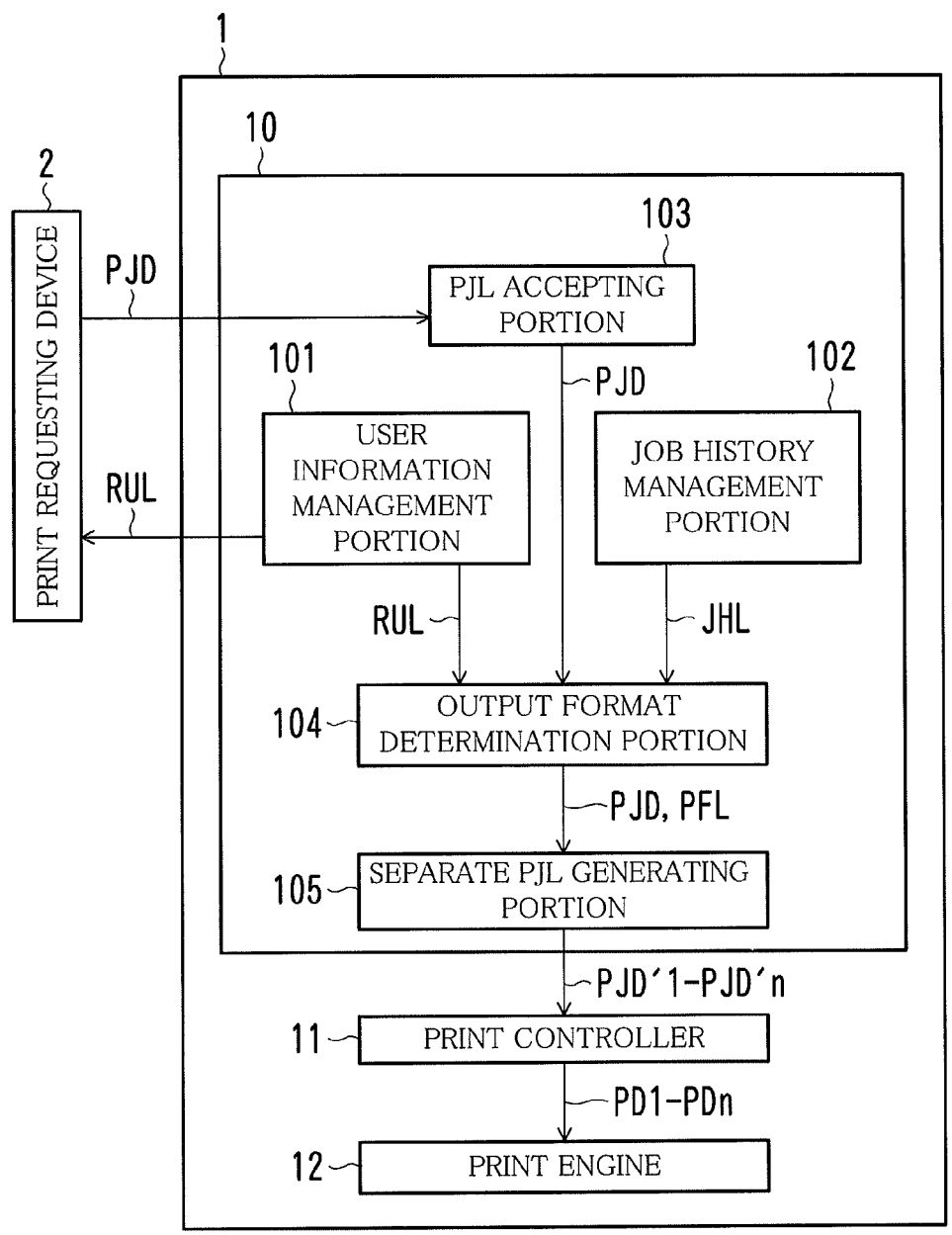
FIG. 3 is a diagram showing an example of a partial functional configuration of a printing device.
Figure 4:
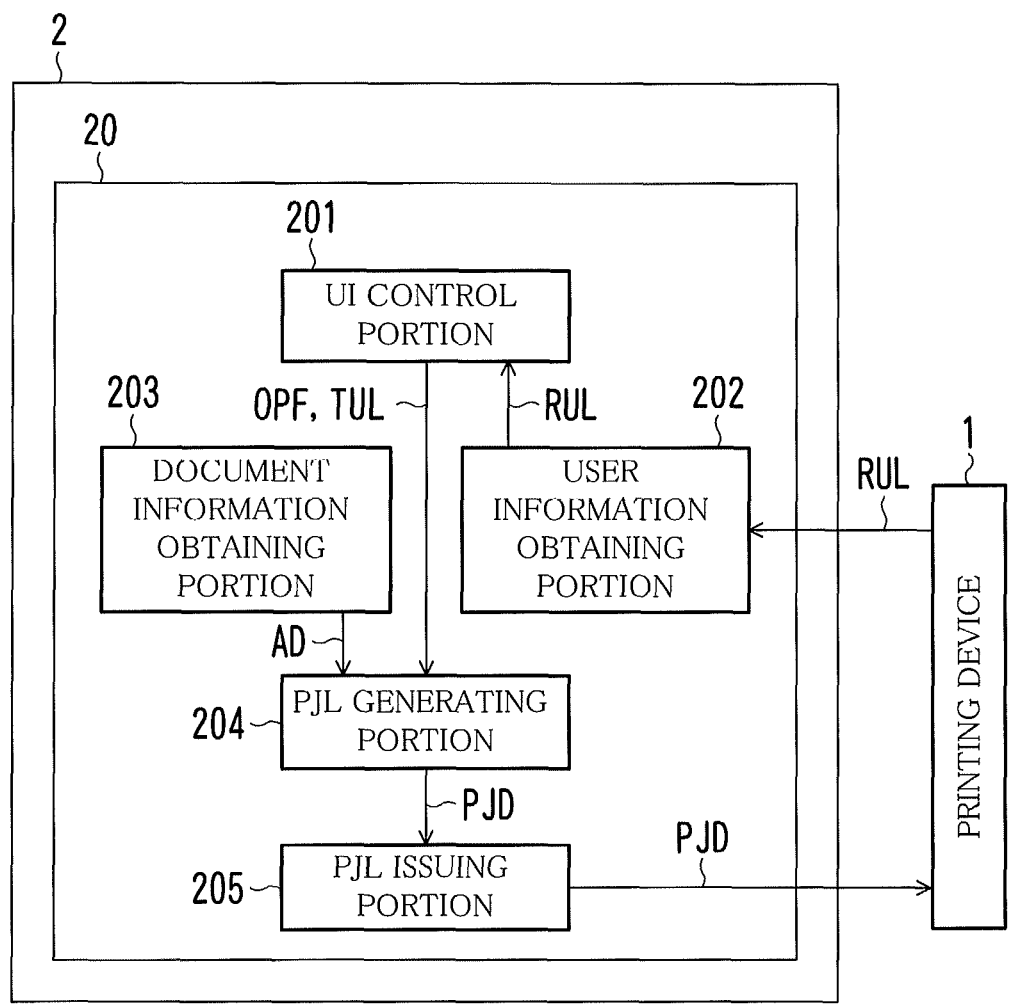
FIG. 4 is a diagram showing an example of a partial functional configuration of a print requesting device.

FIG. 3 is a diagram showing an example of a partial functional configuration of the printing device 1, and FIG. 4 is a diagram showing an example of a partial functional configuration of the print requesting device 2.

Referring to FIG. 3, the printing device 1 is configured of functional portions such as a user information management portion 101, a job history management portion 102, a PJL accepting portion 103, an output format determination portion 104, and a separate PJL generating portion 105. The ROM 10c or the storage 14 stores, therein, programs for implementing the functions of the functional portions 101 through 105. The CPU 10a executes the programs appropriately.

Referring to FIG. 4, the print requesting device 2 is configured of functional portions such as a UI control portion 201, a user information obtaining portion 202, a document information obtaining portion 203, a PJL generating portion 204, and a PJL issuing portion 205. The ROM or the non-volatile storage device stores, as a so-called printer driver, programs for implementing the functions of the functional portions 201 through 205. The CPU executes the programs appropriately. The print requesting device 2 also has an Operating System (OS) and document creation software installed thereon. The OS and the software are also executed appropriately.

Figure 7:
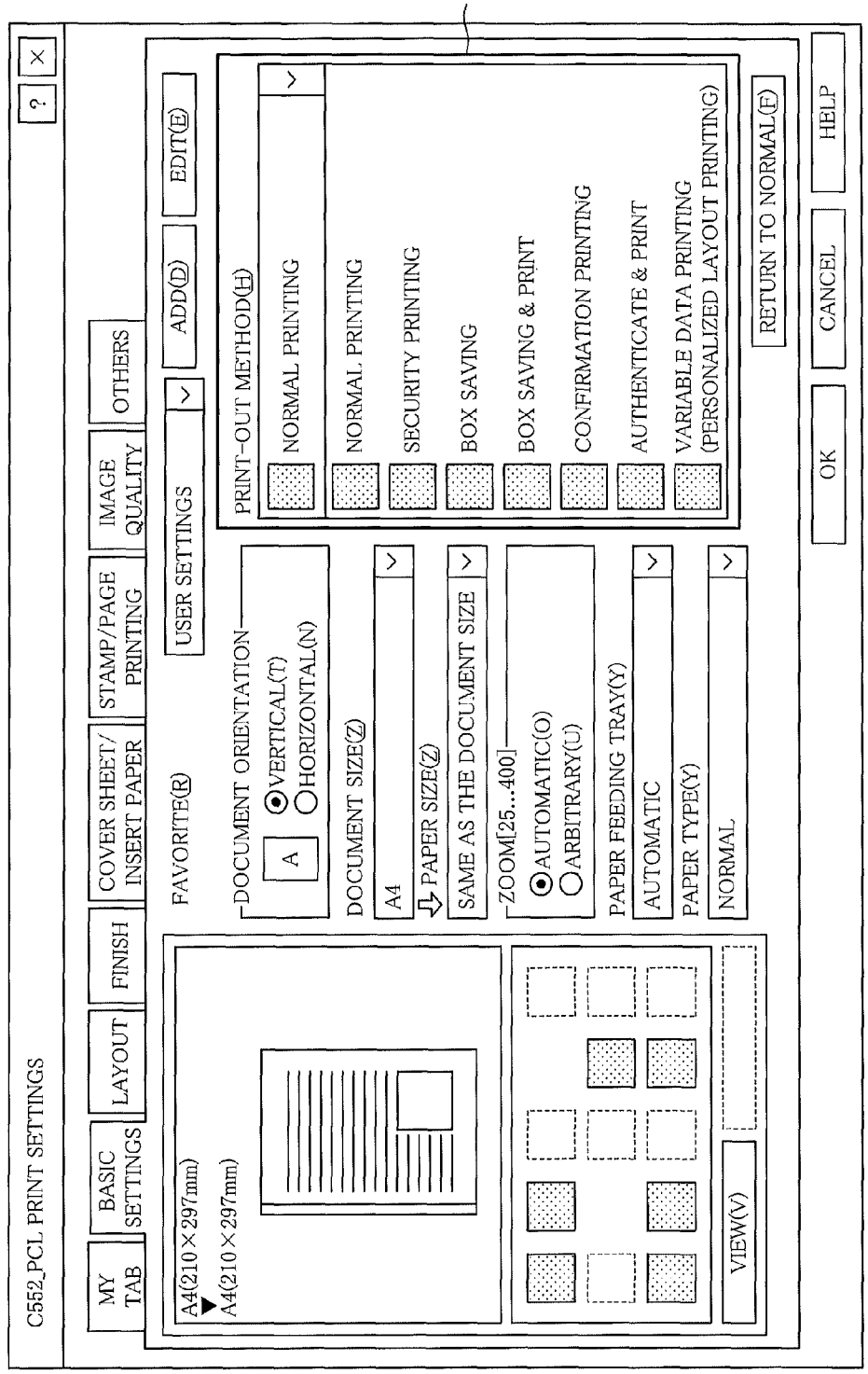
FIG. 7 is a diagram showing an example of a print setting screen.
Figure 10:
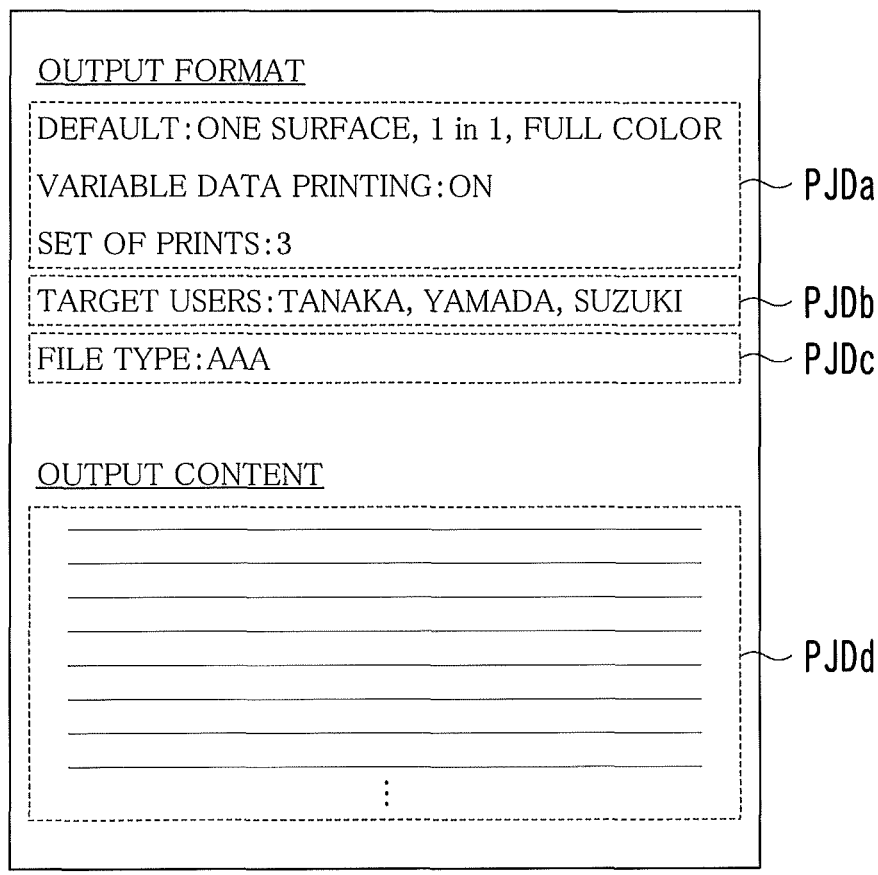
FIG. 10 is a diagram showing an example of print job data.
Figure 12:
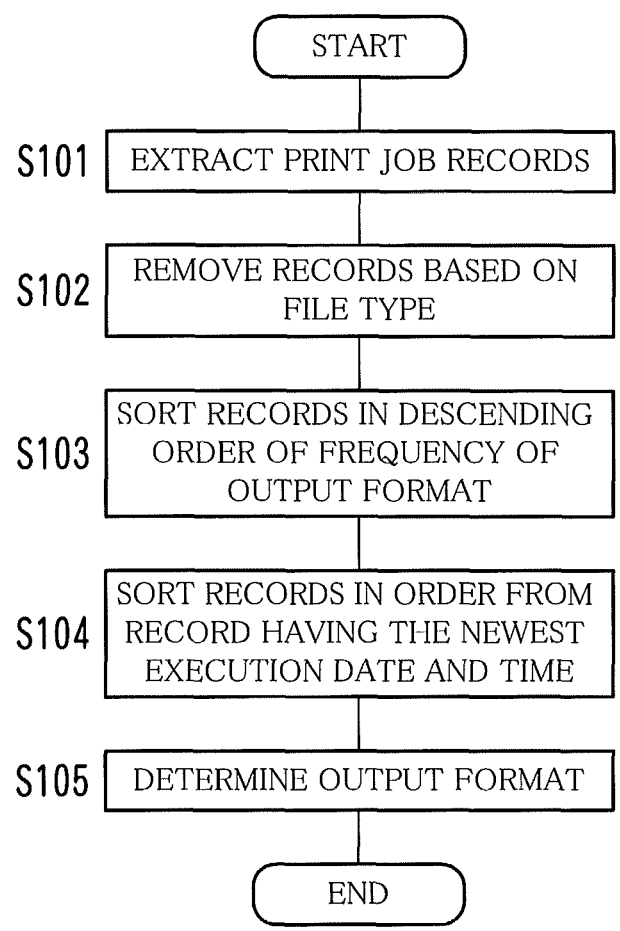
FIG. 12 is a flowchart depicting an example of the flow of an output format determination process.
Figure 15:
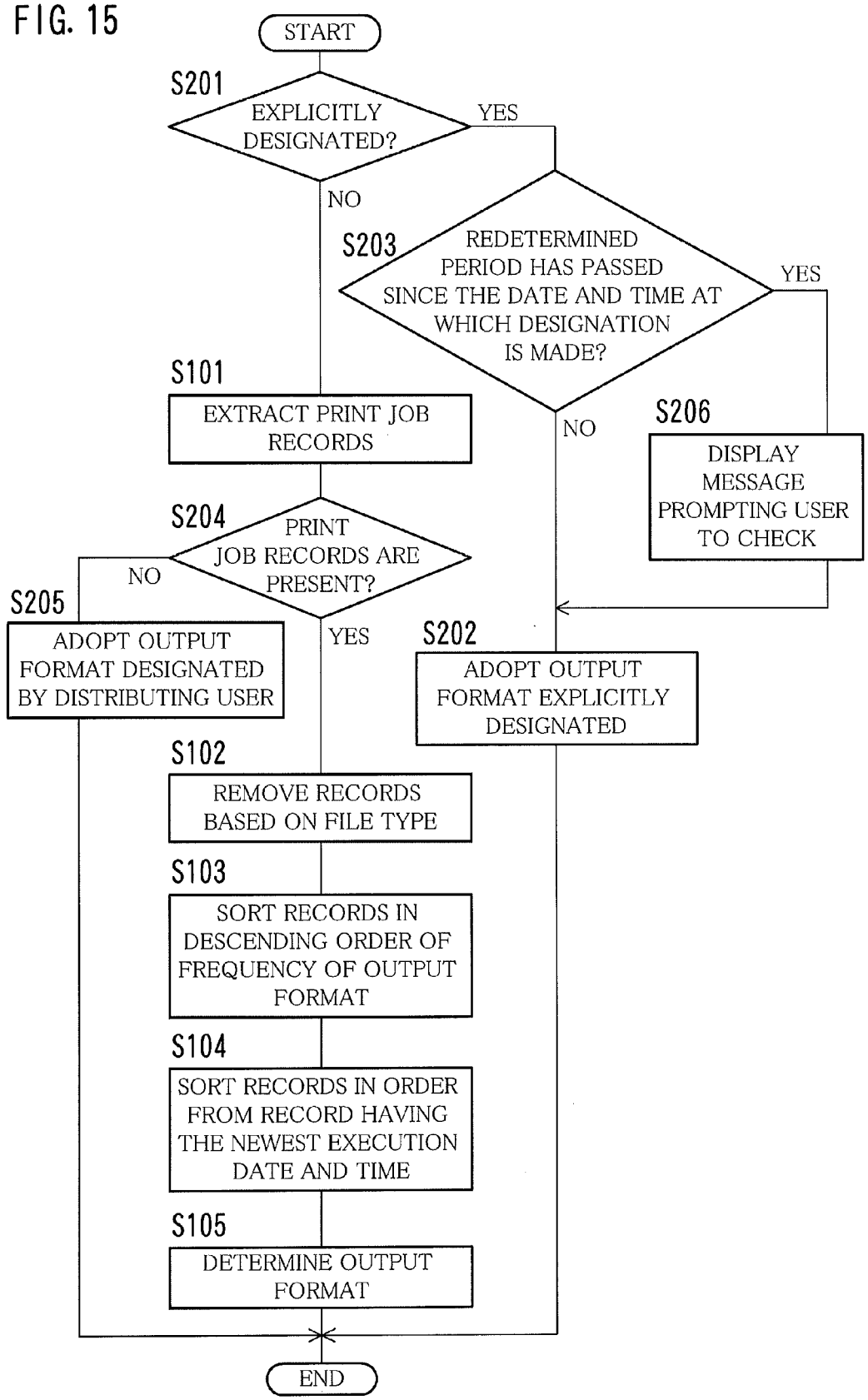
FIG. 15 is a flowchart depicting a modified example of the flow of an output format determination process.
Figure 17A:
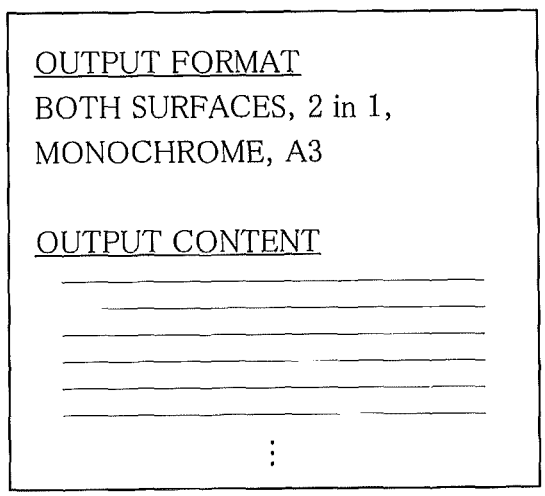
FIGS. 17A through 17C are diagrams showing examples of separate print job data.
Figure 17B:
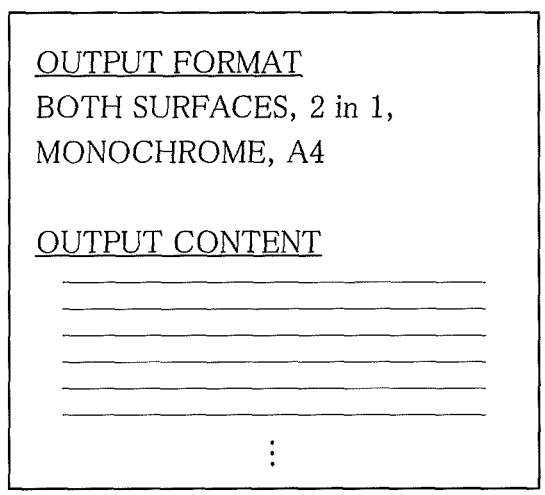
Figure 17C:
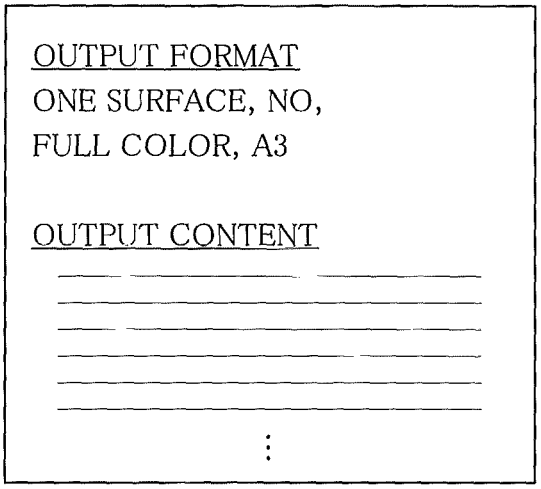

FIG. 5 is a diagram showing an example of a registered user list RUL; FIG. 6 is a diagram showing an example of a job history list JHL; FIG. 7 is a diagram showing an example of a print setting screen G1; FIG. 8 is a diagram showing an example of a target user setting screen G2; FIG. 9 is a diagram showing an example of a target user list TUL; FIG. 10 is a diagram showing an example of print job data PJD; FIG. 11 is a diagram showing an example of actual print job data PJD; FIG. 12 is a flowchart depicting an example of the flow of an output format determination process; FIGS. 13A through 14B are diagrams showing an example of the process of extraction or sort of a print job record; FIG. 15 is a flowchart depicting a modified example of the flow of an output format determination process; FIG. 16 is a diagram showing an example of an output format list PFL; and FIGS. 17A through 17C are diagrams showing examples of separate print job data PJD'.

The following is a description of an example in which a user (hereinafter, called a "distributing user") uses the document creation software installed on the print requesting device 2 to create an electronic document file, and passes printed matters (paper) on which the content of the created document file is printed to a plurality of recipients (3 persons of "TANAKA", "YAMADA", and "SUZUKI"). It is assumed that "TANAKA", "YAMADA", and "SUZUKI" ordinarily use the printing device 1 for printing.

The user information management portion 101 of the printing device 1 (see FIG. 3) manages the registered user list RUL as that shown in FIG. 5. The registered user list RUL contains registered information indicating users who are authorized to use the printing device 1. In the illustrated example of FIG. 5, information on users including "TANAKA", "YAMADA", and "SUZUKI" are registered.

The job history management portion 102 of the printing device 1 (see FIG. 3) manages the job history list JHL as that shown in FIG. 6. The job history list JHL contains a registered history of print jobs that were executed in the printing device 1. To be specific, the job history list JHL contains a record for each executed print job. The record includes user information JHL1 indicating a user who has given a command to execute the corresponding print job, output format information JHL2 indicating an output format (layout) such as a "paper size", "color settings", "page layout", and "output surface", file type information JHL3 indicating the type of a file serving as the basis of printing, and execution date and time information JHL4 indicating a date and time at which the corresponding print job was executed. The "paper size" is information showing the size of output paper which was used for printing. The "color settings" are information indicating that color printing was performed or monochrome printing was performed. The "page layout" is information showing the number of document pages printed onto one surface of output paper. The "output surface" is information indicating that printing was performed onto only one surface of output paper or both surfaces thereof.

The distributing user uses the print requesting device 2 to perform operation for printing the content of a document file created by using the document creation software. For example, the distributing user performs operation to select a print menu from among various menus provided by the document creation software.

In response to this operation, the printer driver stored in the print requesting device 2 starts up. Then, the UI control portion 201 (see FIG. 4) displays the print setting screen G1 as that shown in FIG. 7 on the display device of the print requesting device 2. The print setting screen G1 has option fields in which the distributing user selects a variety of output conditions. Such option fields include an output method option field G1a in which the distributing user can select a desired output method from a list of various output methods.

The distributing user, then, selects "variable data printing (personalized layout printing)" from the list of output methods in the output method option field G1a of the print setting screen G1.

In response to the selection, the UI control portion 201, shown in FIG. 4, displays the target user setting screen G2 as that shown in FIG. 8 on the display device of the print requesting device 2. The target user setting screen G2 is used for the distributing user to designate users to which printed matters are to be distributed (hereinafter, called "recipient users"). The target user setting screen G2 has a direct entry field G2a, a registered user selection field G2b, and a recipient user selection field G2c, which enables the distributing user to designate recipient users by three methods. The target user setting screen G2 also has a target user list field G2d in which users designated by the individual methods are displayed.

The distributing user designates recipient users by using the three methods, alone or in combination.

To be specific, for direct designation of recipient users, the distributing user directly enters information for identifying a recipient user such as the name, the employee number, or the like thereof onto the direct entry field G2a. After completion of the entry, the distributing user presses an "ADD" button. In response to this operation, the entered user name is displayed in the target user list field G2d.

For designation of recipient users from data on users registered in the printing device 1, the distributing user presses a "REFERENCE" button in the registered user selection field G2b. In response to the operation, the user information obtaining portion 202, shown in FIG. 4, requests the printing device 1 to provide the print requesting device 2 with the registered user list RUL. As per the request, the user information management portion 101, shown in FIG. 3, provides the registered user list RUL to the print requesting device 2. Upon the receipt of the registered user list RUL, the UI control portion 201, shown in FIG. 4, displays, on the display section of the registered user selection field G2b, a list of information for identifying users such as the name, the employee number, or the like of users registered in the registered user list RUL. The distributing user, then, selects a desired user from the list, and presses an "ADD" button. This operation allows the name of the selected user to be displayed in the target user list field G2d.

For designation of recipient users from data on users managed in, for example, a Comma Separated Values (CSV) file, the distributing user presses a "REFERENCE" button in the recipient user selection field G2c. In response to this operation, the functions of the OS and the like installed on the print requesting device 2 work to display a screen on which a file is to be selected. The distributing user, then, selects a desired file on the screen. The UI control portion 201, shown in FIG. 4, captures information for identifying users such as the name, the employee number, or the like of users managed in the selected file, and displays a list of the users on the display section of the recipient user selection field G2c. The distributing user selects a desired user from the list, and after that, presses an "ADD" button. Then, the names of the selected users are displayed in the target user list field G2d. Note that such a file for managing users may be, for example, a file that is created to use a "merge printing" function provided by Microsoft Corporation.

When designating recipient users through the methods discussed above, the distributing user designates the recipient users in such a manner that they are displayed, in the target user list field G2d, in the same order as the order that the distributing user is to distribute printed matters to them. After the designation of recipient users, the distributing user presses an "OK" button on the target user setting screen G2. Upon the "OK" button being pressed, the UI control portion 201, shown in FIG. 4, generates a target user list TUL as that shown in FIG. 9. The target user list TUL contains registered information indicating recipient users designated by the distributing user in the same order as that of recipient users displayed in the target user list field G2d. In the illustrated example of FIG. 9, three recipient users of "Tanaka", "Yamada", and "Suzuki" are registered in the target user list TUL.

The distributing user also selects, in the print setting screen G1, an output format (layout) such as "paper size", "color settings", "page layout", and "output surface", and then, presses the "OK" button. Upon the "OK" button being pressed, the UI control portion 201, shown in FIG. 4, creates output format information OPF in which the selected output format information details are aggregated.

In parallel with the processing by the UI control portion 201, or, after the completion of the same, the document information obtaining portion 203 of FIG. 4 obtains, from the document creation software, application data AD indicating the content of a document file serving as the basis of printing.

When the UI control portion 201 creates the target user list TUL and the output format information OPF, and further, when the document information obtaining portion 203 obtains the application data AD, the PJL generating portion 204, shown in FIG. 4, generates print job data PJD in which the information indicated in the output format information OPF and the application data AD is described in a predetermined printer language as shown in FIG. 10. The print job data PJD contains, for example, information indicating an output format (the part defined by PJDa of FIG. 10), information indicating recipient users (the part defined by PJDb of FIG. 10), information indicating the type of a file serving as the basis of printing (the part defined by PJDc of FIG. 10), and information indicating the output details (the part defined by PJDd of FIG. 10). Recipient users described in the recipient user information are indicated in the same order as that of recipient user information registered in the target user list TUL. Note that FIG. 10 shows the contents of the print job data PJD in an easy-to-understand manner. The actual print job data PDJ has a structure as that shown in FIG. 11.

The PJL issuing portion 205, shown in FIG. 4, sends the print job data PDJ generated by the PJL generating portion 204 to the printing device 1.

The PJL accepting portion 103, shown in FIG. 3, receives the print job data PJD from the print requesting device 2.

When the PJL accepting portion 103 receives the print job data PJD, the output format determination portion 104, shown in FIG. 3, extracts information on recipient users contained in the print job data PJD, and analyzes, for each recipient user thus extracted, an output format according to his/her personal preference.

To be specific, the output format determination portion 104 refers to the registered user list RUL (see FIG. 5) managed by the user information management portion 101, and checks whether or not each of the recipient users indicated in the print job data PDJ matches any of users registered in the printing device 1. Then, the output format determination portion 104 performs processing shown in the flowchart of FIG. 12 for each recipient user who has been confirmed as the registered user, and analyzes an output format according to the recipient user's personal preference.

To be more specific, the output format determination portion 104 refers to the job history list JHL (see FIG. 6) managed by the job history management portion 102, and extracts records of print jobs having the recipient users in the user information JHL1 (Step S101). A record of a print job having, in the file type information JHL3, a file type different from the file type indicated in the print job data PJD is excluded from the extracted records of print jobs (Step S102). As for the remaining records of print jobs, records of print jobs having completely the same details in the output format information JHL2 are regarded as one group. The groups are then sorted in descending order of the number of print job records contained in a group. In short, the records are sorted in order from the most frequently used output format to the least frequently used output format (Step S103). As for the sorted print job records, groups having the same number of print job records are sorted in order from a group including a record of a print job having the newest date and time indicated in the execution date and time information JHL4. In short, the print job records are sorted in order from a record of a print job having the newest execution date and time (Step S104). After these sort processes, the output format determination portion 104 determines that an output format such as the "paper size", "color settings", "page layout", and "output surface" which are indicated in the output format information JHL2 of the top record of the print job is an output format based on the recipient user's personal preference (Step S105). In this way, for determining an output format based on the history of print jobs, the executed output format and the execution date and time are taken into consideration.

The following is more detailed description of the processing flow of the flowchart of FIG. 12 by taking an example of the process in which recipient users include "TANAKA", and a determination is made for an output format according to the preference of "TANAKA". The detailed description is provided below with reference to an example of extraction or sort steps of print job records shown in FIGS. 13A through and 14B.

In Step S101, records of print jobs having "TANAKA" in the user information JHL1 are extracted (see FIG. 13A). If the file type indicated in the print job data PJD is "AAA", then records of print jobs having "00015" and "00021" indicated in the management number of the file type information JHL3 are removed in Step S102. Because such print jobs to be removed show a file type other than "AAA" indicated in the print job data PJD (see FIG. 13B). In Step S103, records of print jobs having completely the same details in the output format information JHL2 are defined as one group. To be specific, records of print jobs having a management number "00001" and "00005" respectively are handled as one group (regarded as "Group 1"). Likewise, records of print jobs having a management number "00011" and "00031" respectively are handled as one group (regarded as "Group 2"). Likewise, a record of a print job having a management number "00021" is handled as one group (regarded as "Group 3"). Then, the groups are sorted in descending order of the number of print job records contained in a group, i.e., sorted in the order of Group 1, Group 2, and Group 3 (see FIG. 14A). In Step S104, as for Group 1 and Group 2 each of which has two print job records, sort is so performed that Group 2 is ranked higher than Group 1 because the Group 2 includes the print job record having "00031" in the management number and "2010/11/10 09:00" in the execution date and time information JHL4, which is a new record compared to Group 1 (see FIG. 14B). After the sort processes, the output format determination portion 104 determines, in Step S105, that an output format of "A3", "monochrome", "2-in-1", and "both surfaces" indicated in the output format information JHL2 of the top record of the print job having a management number "00011" is an output format based on "TANAKA"'s personal preference.

In this way, the output format determination portion 104 of FIG. 3 analyzes, for each recipient user indicated in the print job data PJD, an output format according to his/her own preference. However, even if a print job record is already present for a recipient user, as long as his/her preferred output format is explicitly designated in the registered user list RUL, or the like as shown in FIG. 15 (Yes in Step S201), the explicitly designated output format may be used (Step S202). In such a case, the date and time at which the recipient user explicitly designated the output format is checked. If a predetermined period of time, e.g., 2 months or longer has passed since the date and time at which the recipient user designated (Yes in Step S203), then the operating panel 15 may display a message prompting the recipient user to check again the output format previously designated when he/she logs onto the printing device 1 the next time (Step S206). As for a recipient user for whom no print job records are present (No in Step S204), it is possible to use an output format contained in the print job data PDJ and designated by the distributing user (Step S205).

The output format determination portion 104 of FIG. 3 ultimately creates an output format list PFL as that shown in FIG. 16. The output format list PFL contains, for each recipient user, registered information indicating an output format determined or adopted by the output format determination portion 104. A plurality of pieces of the information indicating output formats are registered in the same order as that described in the print job data PJD.

When the output format determination portion 104 creates the output format list PFL, the separate PJL generating portion 105 of FIG. 3 generates separate print job data PJD' that is print job data PJD for each recipient user indicated in the print job data PJD (each recipient user registered in the output format list PFL). To be specific, if there are "n" recipient users, "n" sets of separate print job data PJD'1 through PJD'n are generated. Each set of the separate print job data PJD' contains output format information and output content information. Output format information registered in the output format list PFL is reflected in the output format information.

In the case where, for example, the output format list PFL contains registered information indicating output formats of three recipient users of "TANAKA", "YAMADA", and "SUZUKI" as shown in the example of FIG. 16, separate print job data PJD'1 through PJD'3 are created for the recipient users as shown in the example of FIGS. 17A through 17C.

FIG. 17A shows separate print job data PJD'1 for "TANAKA", FIG. 17B shows separate print job data PJD'2 for "YAMADA", and FIG. 17C shows separate print job data PJD'3 for "SUZUKI".

The separate PJL generating portion 105 of FIG. 3 outputs, to the print controller 11, separate print job data PJD' every time when the separate print job data PJD' is created, or, alternatively, after all the sets of separate print job data PJD' are created. The separate PJL generating portion 105 may output the individual sets of separate print job data PJD' in the order that the sets of separate print job data PJD' are indicated in the print job data PJD, i.e., in the order that the sets of separate print job data PJD' are registered in the output format list PFL. Alternatively, the separate PJL generating portion 105 may output the separate print job data PJD' in such a manner that, regardless of the order indicated in the print job data PDJ, plurality sets of separate print job data PJD' having the same or similar output format are outputted successively. The former output method is convenient for the distributing user because printing is carried out in the order that the distributing user is to distribute printed matters. The latter output method is effective for the print controller 11 and the print engine 12 because printing of which output formats are similar to one another is carried out successively.

After the print controller 11 generates a plurality of sets of image data PD corresponding to a plurality of sets of separate print job data PJD', the generated sets of image data PD are outputted to the print engine 12. Then, the print engine 12 prints, onto output paper, an image tailored to each recipient user's preferred output format indicated in each piece of image data PD.

Figure 18:
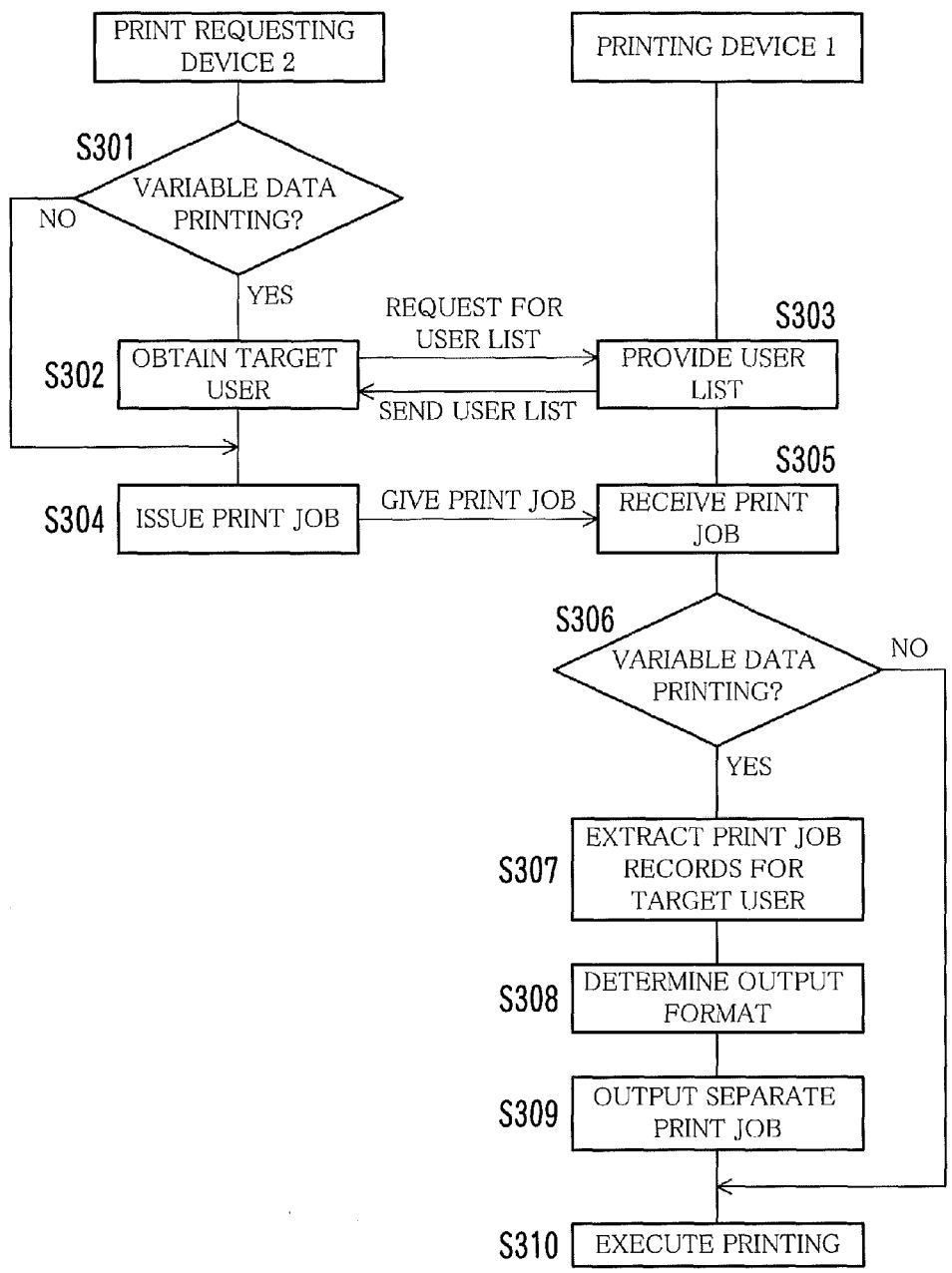
FIG. 18 is a flowchart depicting an example of the entire processing flow of a printing system.
Figure 19:
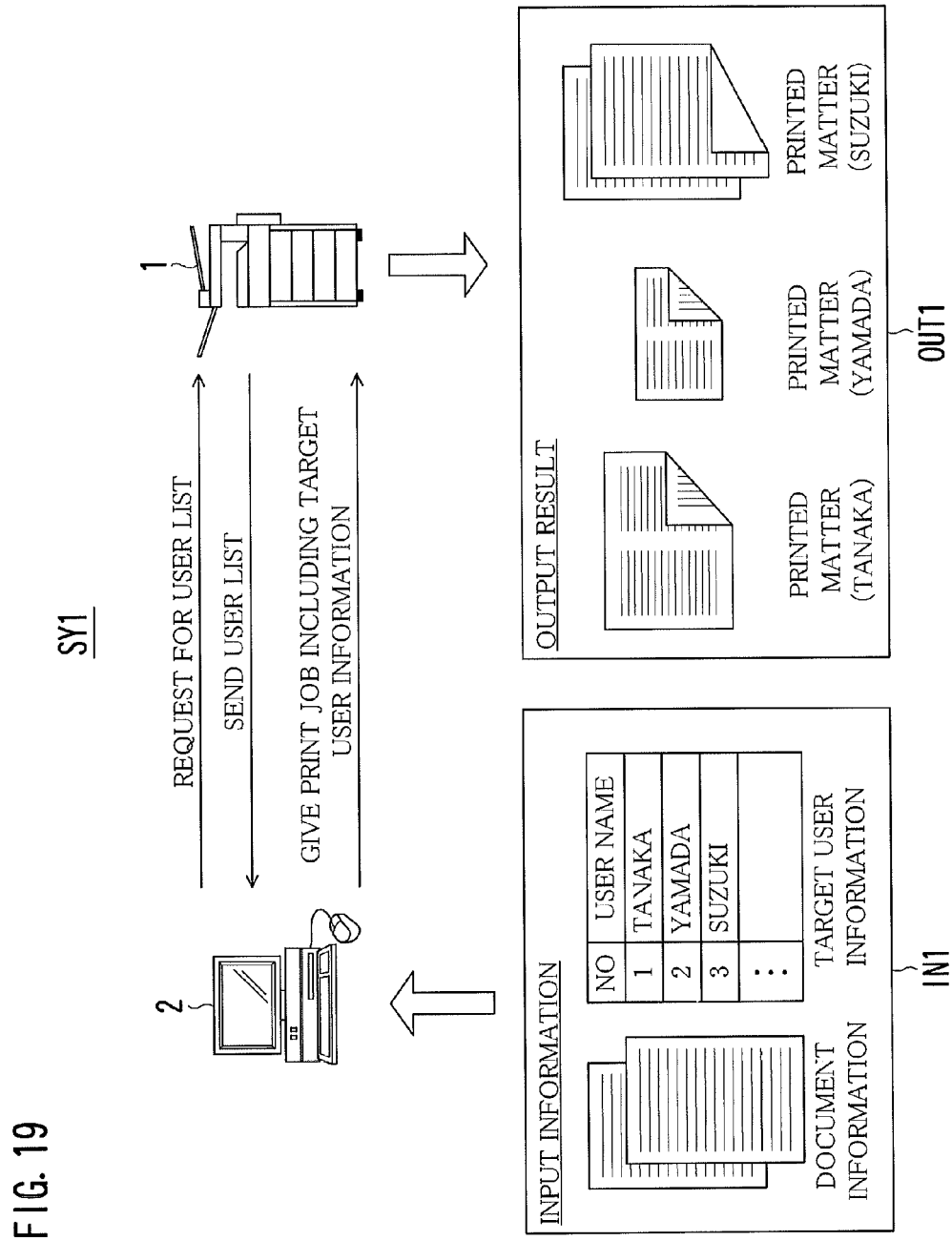
FIG. 19 is a schematic diagram showing an example of data sent and received between devices constituting a printing system.

FIG. 18 is a flowchart depicting an example of the entire processing flow of the printing system SY1, and FIG. 19 is a schematic diagram showing an example of data sent and received between devices constituting the printing system SY1.

The general description of the first embodiment is provided below with reference to the flowchart of FIG. 18 and the schematic diagram of FIG. 19.

Referring to FIG. 18, when a command is issued to carry out variable data printing (Yes in Step S301), the print requesting device 2 shows, to a user, information on users registered in a user list provided by the printing device 1, for example, and then obtains information on target users designated, by the user, as recipient users (Step S302). The printing device 1 provides the print requesting device 2 with the user list in accordance with a request from the print requesting device 2 (Step S303). The print requesting device 2, then, generates a print job containing information indicating the target users, and sends the generated print job to the printing device 1 (Step S304).

Upon the receipt of the print job from the print requesting device 2 (Step S305), the printing device 1 checks whether or not variable data printing is designated in the print job (Step S306). If the variable data printing is designated (Yes in Step S306), then the printing device 1 performs the following process for each target user. First, the printing device 1 extracts print job records corresponding to the target user (Step S307). Second, the printing device 1 determines an output format based on a personal preference of the target user through the method shown in FIG. 12 or FIG. 15 (Step S308). Lastly, the printing device 1 generates a separate print job for the target user, outputs the generated separate print job to the print controller 11, and so on, and performs printing in the print engine 12.

Referring to FIG. 19, the print requesting device 2 receives, for example, an input of document information indicating a print target and an input of target user information indicating recipients of printed matters (IN1), and the printing device 1 outputs a printed matter in accordance with a customized output format for each recipient user indicated in the target user information (OUT1). During the process, the printing device 1 provides the print requesting device 2 with the user list, and the print requesting device 2 gives a print job containing target user information to the printing device 1.

In the first embodiment, the main control unit 10 implements the individual functions of the PJL accepting portion 103, the output format determination portion 104, and the separate PJL generating portion 105. Instead, however, another device such as the print controller 11 may implement a part or the entire of those functions.

In this embodiment, the output format determination portion 104 determines an output format according to each recipient user's personal preference at a time when the PJL accepting portion 103 receives print job data PJD. Instead of this, however, the output format determination portion 104 may regularly check output formats according to users' personal preference registered in the printing device 1, and may keep the result therein.

Second Embodiment

Figure 20:
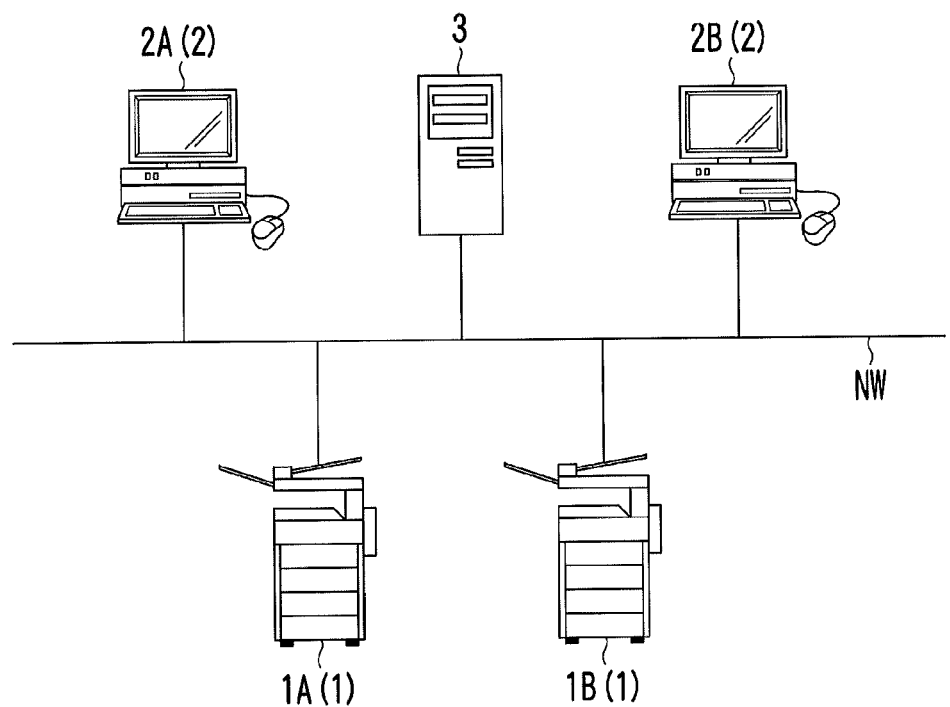
FIG. 20 is a diagram showing an example of a printing system according to second and third embodiments.

FIG. 20 is a diagram showing an example of a printing system SY2 according to the second embodiment.

Referring to FIG. 20, the printing system SY2 differs from the printing system SY1 shown in FIG. 1 of the first embodiment in that, in addition to the printing devices 1A through 1B and the print requesting devices 2A through 2B, an authentication server 3 is also connected to the network NW. Hereinafter, the printing devices 1A through 1B and the print requesting devices 2A through 2B may be collectively denoted by reference numerals 1 and 2, respectively. Further, the functional configurations of the printing device 1 and the print requesting device 2 of the printing system SY2 partly differ from those of the printing device 1 and the print requesting device 2 of the printing system SY1.

The second embodiment shall be described, focusing on constituent elements different from those of the first embodiment. Constituent elements that are the same as those in the first embodiment have been given the same reference signs, and detailed descriptions thereof have been appropriately omitted.

The authentication server 3 is configured of a main control unit 30 (see FIG. 23) including a CPU, a RAM, and a ROM, a non-volatile storage device, a display device, an inputting device such as a keyboard and a pointing device, a network interface for sending and receiving data with other information processing devices via a network such as a LAN, and so on.

Figure 21:
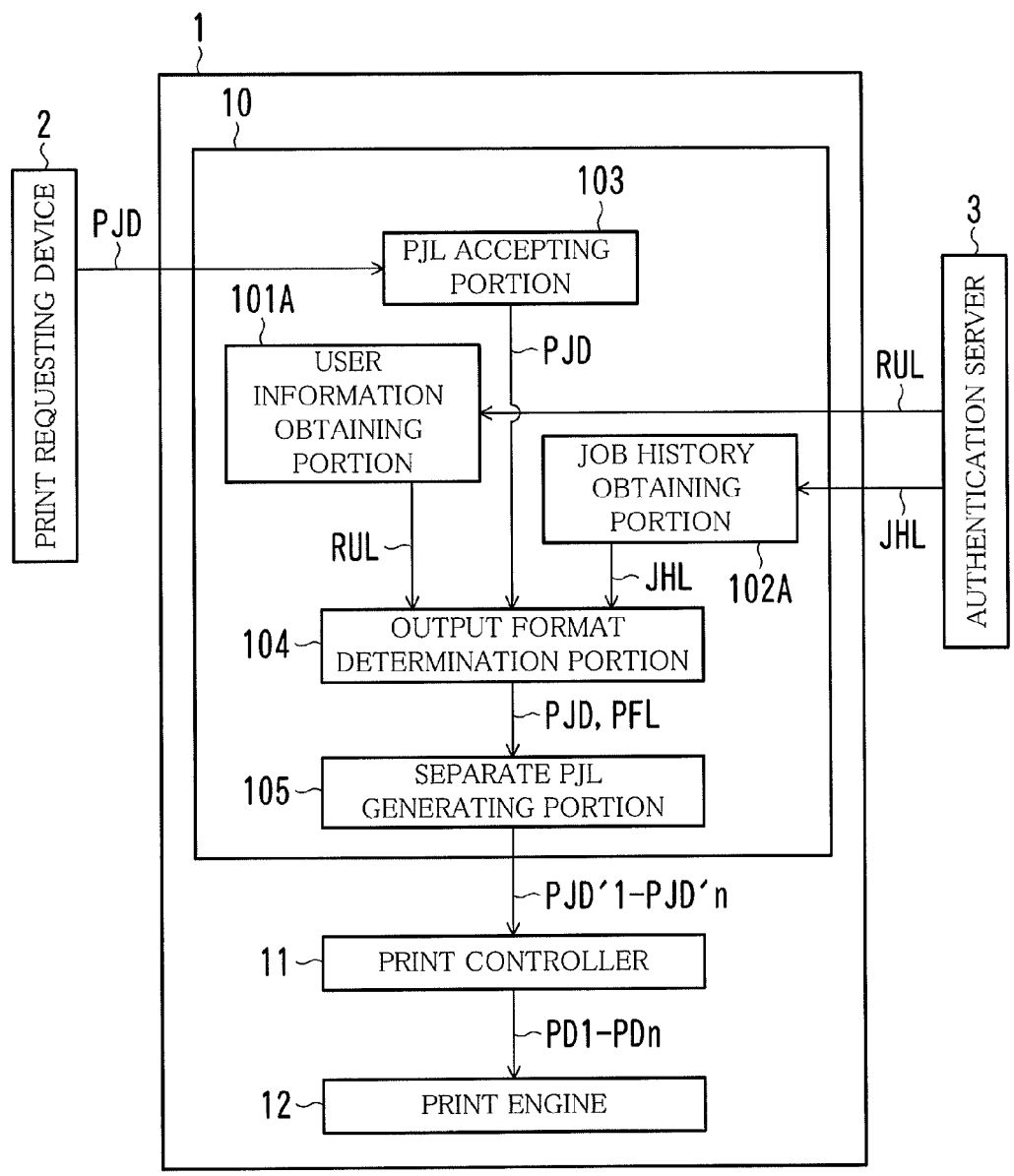
FIG. 21 is a diagram showing an example of a partial functional configuration of a printing device.
Figure 22:
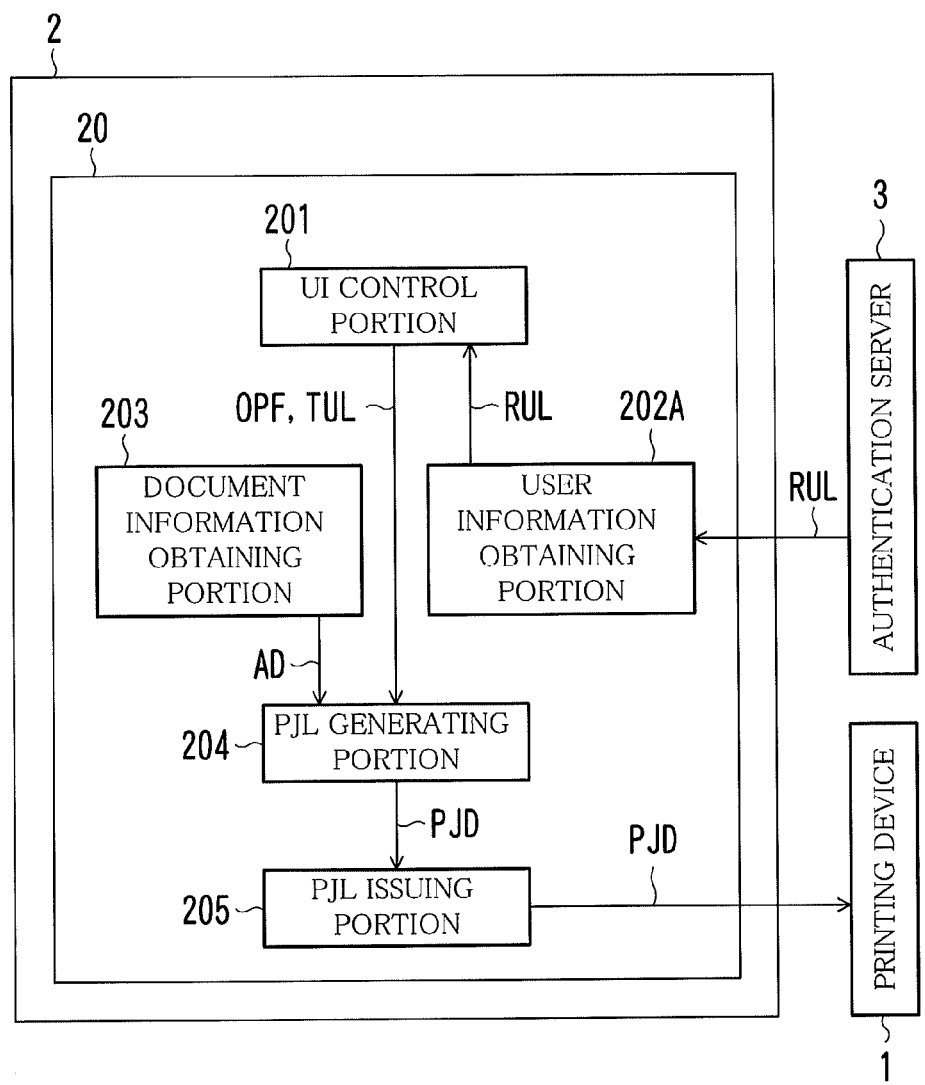
FIG. 22 is a diagram showing an example of a partial functional configuration of a print requesting device.

FIG. 21 is a diagram showing an example of a partial functional configuration of the printing device 1; FIG. 22 is a diagram showing an example of a partial functional configuration of the print requesting device 2; and FIG. 23 is a diagram showing an example of a partial functional configuration of the authentication server 3.

In the first embodiment, the user information management portion 101 and the job history management portion 102 are provided in the printing device 1 as shown in FIG. 3. In the second embodiment, as shown in FIG. 23, a user information management portion 301 and a job history management portion 302, corresponding to the user information management portion 101 and the job history management portion 102 respectively, are provided in the authentication server 3.

Figure 23:
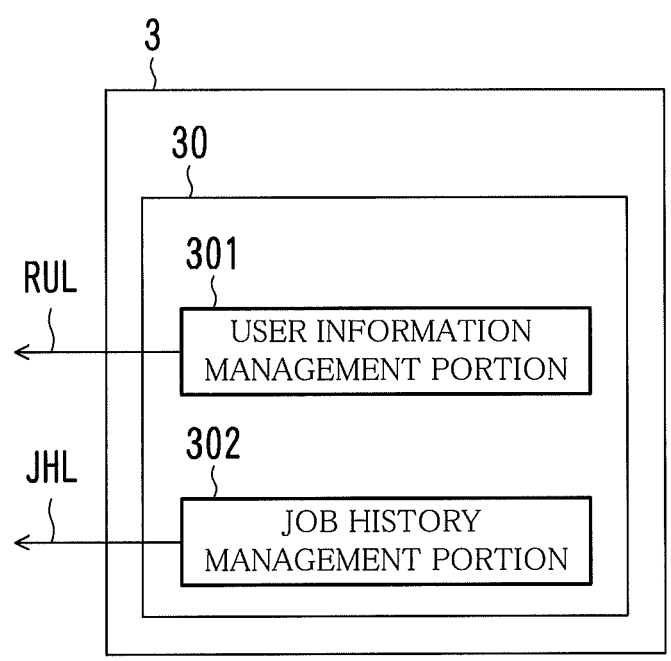
FIG. 23 is a diagram showing an example of a partial functional configuration of an authentication server.

The user information management portion 301 of FIG. 23 manages the registered user list RUL as that shown in FIG. 5. The registered user list RUL contains registered information indicating users authorized to use the printing devices 1 (1A through 1B).

The job history management portion 302 of FIG. 23 manages the job history list JHL as that shown in FIG. 6. The job history list JHL contains, therein, a registered history of print jobs that were executed in the printing devices 1 (1A through 1B).

When a distributing user presses the "REFERENCE" button in the registered user selection field G2b (see FIG. 8) of the target user setting screen G2, a user information obtaining portion 202A of FIG. 22 requests the registered user list RUL not from the printing device 1 but from the authentication server 3, and the user information management portion 301 of FIG. 23 provides the print requesting device 2 with the registered user list RUL.

When a PJL accepting portion 103 receives print job data PJD, a user information obtaining portion 101A of FIG. 21 requests the registered user list RUL from the authentication server 3, and the user information management portion 301 of FIG. 23 provides the registered user list RUL to the printing device 1. The registered user list RUL thus provided is used when the output format determination portion 104 determines an output format according to each recipient user's personal preference.

When the PJL accepting portion 103 receives the print job data PJD, a job history obtaining portion 102A of FIG. 21 requests the job history list JHL from the authentication server 3, and the job history management portion 302 of FIG. 23 provides the job history list JHL to the printing device 1. The job history list JHL thus provided is used when the output format determination portion 104 determines an output format according to each recipient user's personal preference.

In this way, according to the printing system SY2 of the second embodiment, the authentication server 3 manages the registered user list RUL and the job history list JHL.

The foregoing description focuses on the points that differ from the first embodiment. The general description of the second embodiment is provided below with reference to the schematic diagram of FIG. 24.

Figure 24:
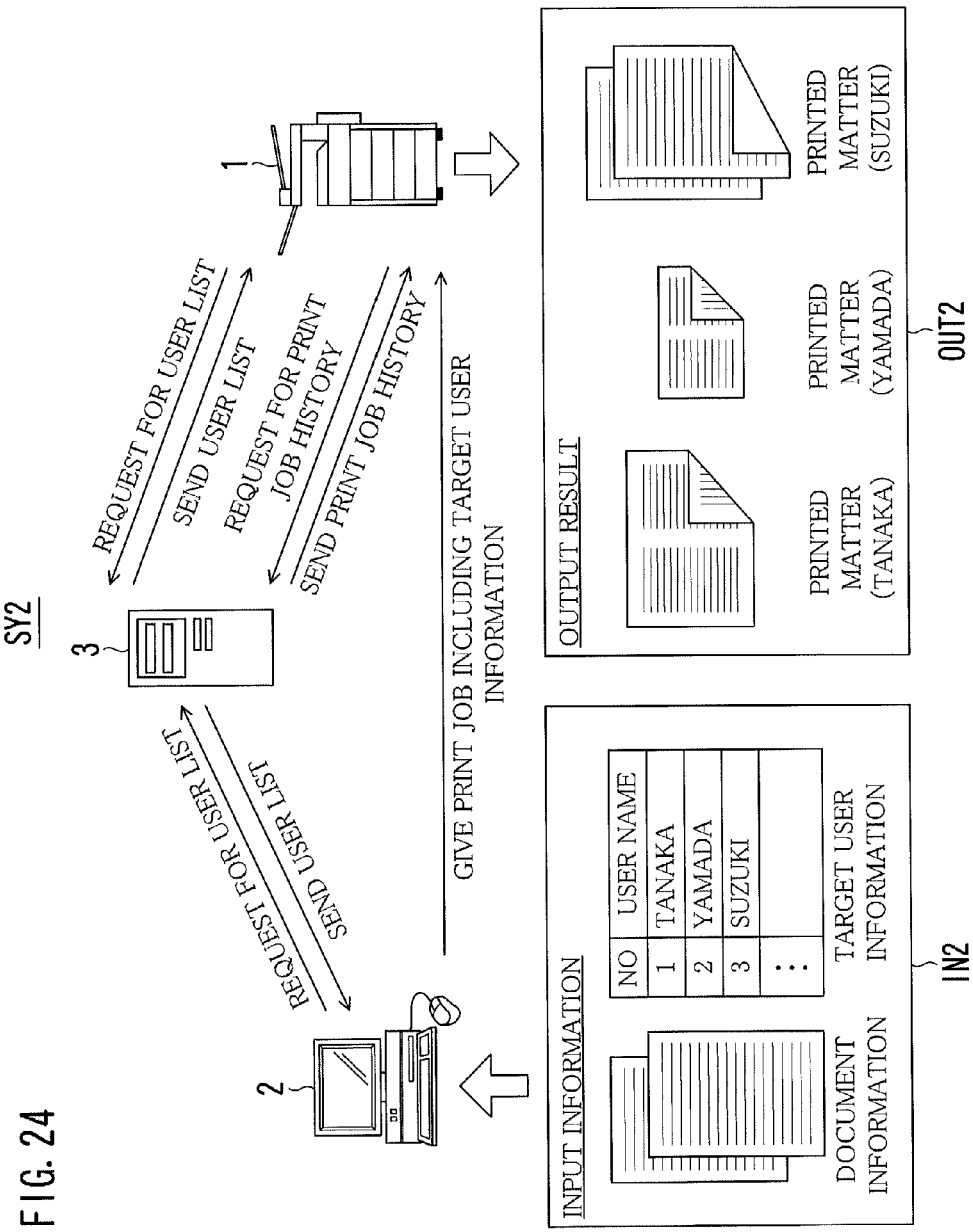
FIG. 24 is a schematic diagram showing an example of data sent and received between devices constituting a printing system.

Referring to FIG. 24, as with the case of the first embodiment, the print requesting device 2 receives an input of document information indicating a print target, an input of target user information indicating recipients of printed matters, and so on (IN2), and the printing device 1 outputs a printed matter in accordance with a customized output format for each recipient user indicated in the target user information (OUT2). During the process, the authentication server 3 provides the print requesting device 2 with the user list, and provides the printing device 1 with the user list and a print job history, and the print requesting device 2 gives a print job containing target user information to the printing device 1.

Third Embodiment

A printing system SY3 according to the third embodiment has a configuration similar to that of the printing system SY2 shown in FIG. 20 according to the second embodiment. To be specific, the printing system SY3 has a configuration in which the printing devices 1A through 1B, the print requesting devices 2A through 2B, and the authentication server 3 are connected to one another via the network NW as shown in FIG. 20. Hereinafter, the printing devices 1A through 1B and the print requesting devices 2A through 2B may be collectively denoted by reference numerals 1 and 2, respectively.

The functional configurations of the printing device 1 and the print requesting device 2 according to the third embodiment partly differ from those of the printing device 1 and the print requesting device 2 in the printing system SY2.

The third embodiment shall be described, focusing on constituent elements different from those of the second embodiment. Constituent elements that are the same as those in the second embodiment have been given the same reference signs, and detailed descriptions thereof have been appropriately omitted.

Figure 25:
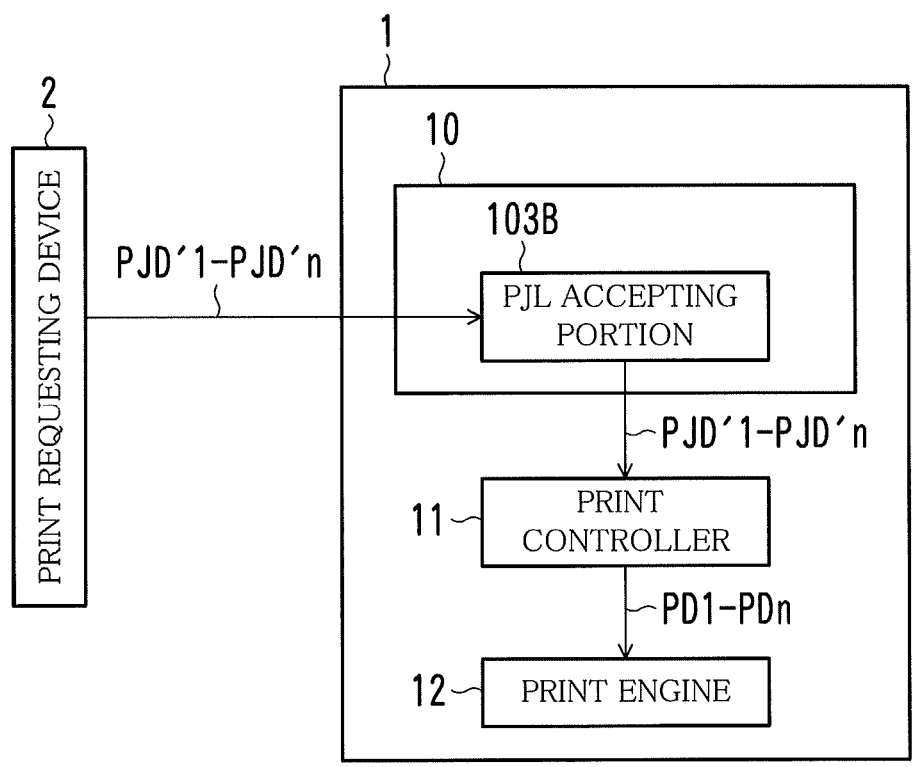
FIG. 25 is a diagram showing an example of a partial functional configuration of a printing device.
Figure 26:
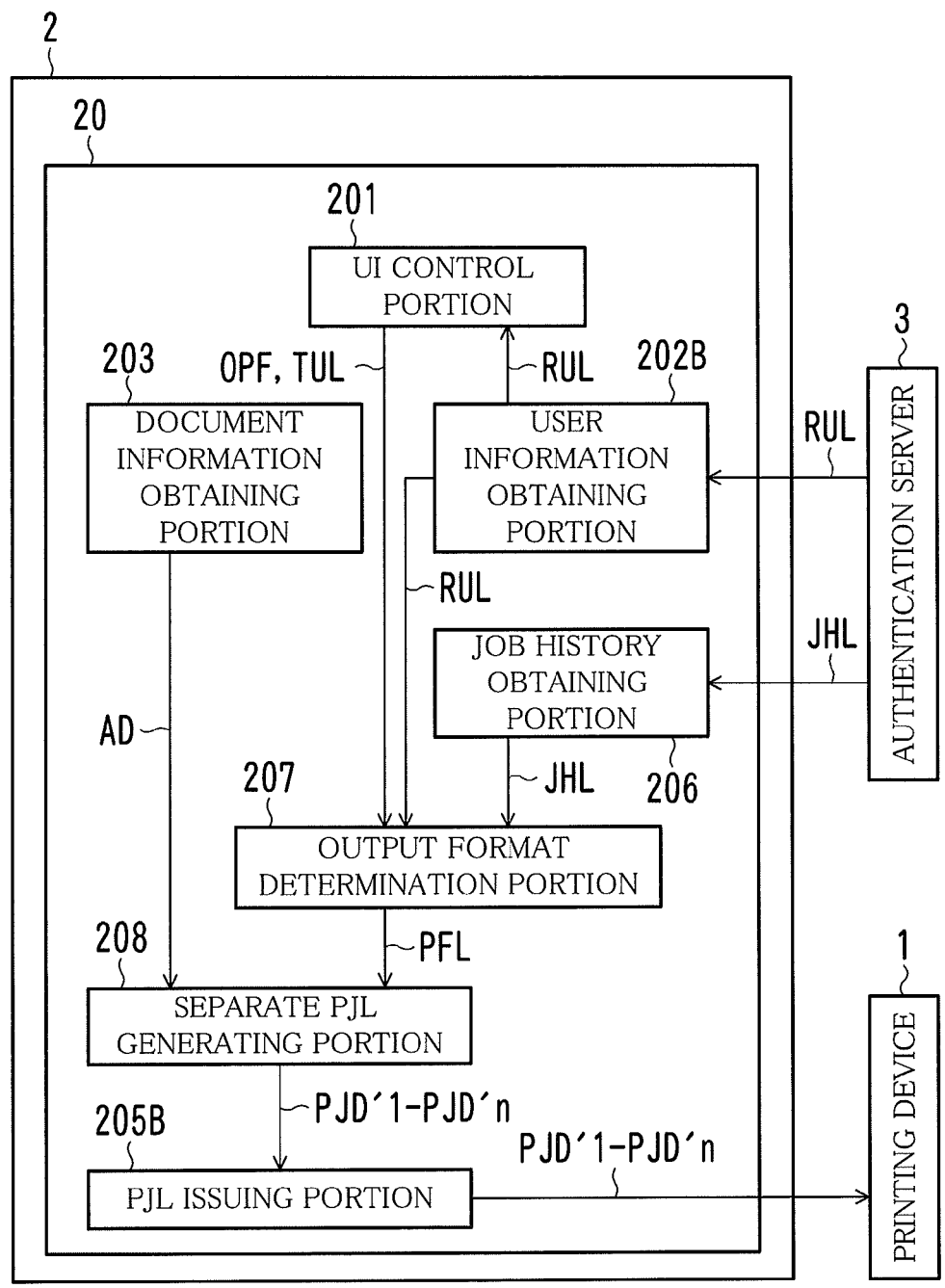
FIG. 26 is a diagram showing an example of a partial functional configuration of a print requesting device.

FIG. 25 is a diagram showing an example of a partial functional configuration of the printing device 1, and FIG. 26 is a diagram showing an example of a partial functional configuration of the print requesting device 2.

In the second embodiment, the user information obtaining portion 101A, the job history obtaining portion 102A, the output format determination portion 104, and the separate PJL generating portion 105 are provided in the printing device 1 as shown in FIG. 21. In the third embodiment, as shown in FIG. 26, a user information obtaining portion 202B, a job history obtaining portion 206, an output format determination portion 207, and an separate PJL generating portion 208, corresponding to the user information obtaining portion 101A, the job history obtaining portion 102A, the output format determination portion 104, and the separate PJL generating portion 105 respectively, are provided in the print requesting device 2.

When the UI control portion 201 creates the target user list TUL (see FIG. 9), the user information obtaining portion 202B of FIG. 26 requests the registered user list RUL (see FIG. 5) from the authentication server 3, and the user information management portion 301 of FIG. 23 provides the registered user list RUL to the print requesting device 2. The registered user list RUL thus provided is used when the output format determination portion 207 determines an output format according to each recipient user's personal preference. As with the user information obtaining portion 202A (see FIG. 22) of the second embodiment, the user information obtaining portion 202B also requests the registered user list RUL from the authentication server 3 and receives the registered user list RUL therefrom when the distributing user presses the "REFERENCE" button in the registered user selection field G2b (see FIG. 8) of the target user setting screen G2. In such a case, it is not necessary to obtain the registered user list RUL once again.

When the UI control portion 201 creates the target user list TUL (see FIG. 9), the job history obtaining portion 206 of FIG. 26 requests the job history list JHL (see FIG. 6) from the authentication server 3, and the job history management portion 302 of FIG. 23 provides the job history list JHL to the print requesting device 2. The job history list JHL thus provided is used when the output format determination portion 207 determines an output format according to each recipient user's personal preference.

When the UI control portion 201 creates the target user list TUL, the user information obtaining portion 202B obtains the registered user list RUL, and the job history obtaining portion 206 obtains the job history list JHL, the output format determination portion 207 of FIG. 26 performs the same processing as that by the output format determination portion 104 (see FIGS. 3 and 21) of the first and second embodiments. To be specific, the output format determination portion 207 refers to the registered user list RUL and checks whether or not each of the recipient users indicated in the target user list TUL matches any of users registered in the authentication server 3. Then, the output format determination portion 207 performs, for each recipient user who has been confirmed as the registered user, the process shown in the flowchart of FIG. 12 or FIG. 15 to analyze an output format according to the recipient user's personal preference. Thereby, the output format determination portion 207 creates the output format list PFL (see FIG. 16).

When the document information obtaining portion 203 obtains application data AD, and the output format determination portion 207 creates the output format list PFL, the separate PJL generating portion 208 of FIG. 26 performs the same processing as that by the separate PJL generating portion 105 (see FIG. 3 and FIG. 21) according to the first and second embodiments. Thereby, the separate PJL generating portion 208 generates separate print job data PJD', which is print job data PJD for each recipient user.

A PJL issuing portion 205B of FIG. 26 sends, to the printing device 1, separate print job data PJD' generated by the separate PJL generating portion 208.

A PJL accepting portion 103B of FIG. 25 outputs, to the print controller 11, separate print job data PJD' received from the print requesting device 2.

As discussed above, in the printing system SY3 according to the third embodiment, it is the print requesting device 2 that generates separate print job data PJD'. In the third embodiment, the registered user list RUL and the job history list JHL may be managed by the printing device 1 as with the first embodiment.

The foregoing description focuses on the points that differ from the second embodiment. The general description of the third embodiment is provided below with reference to the schematic diagram of FIG. 27.

Figure 27:
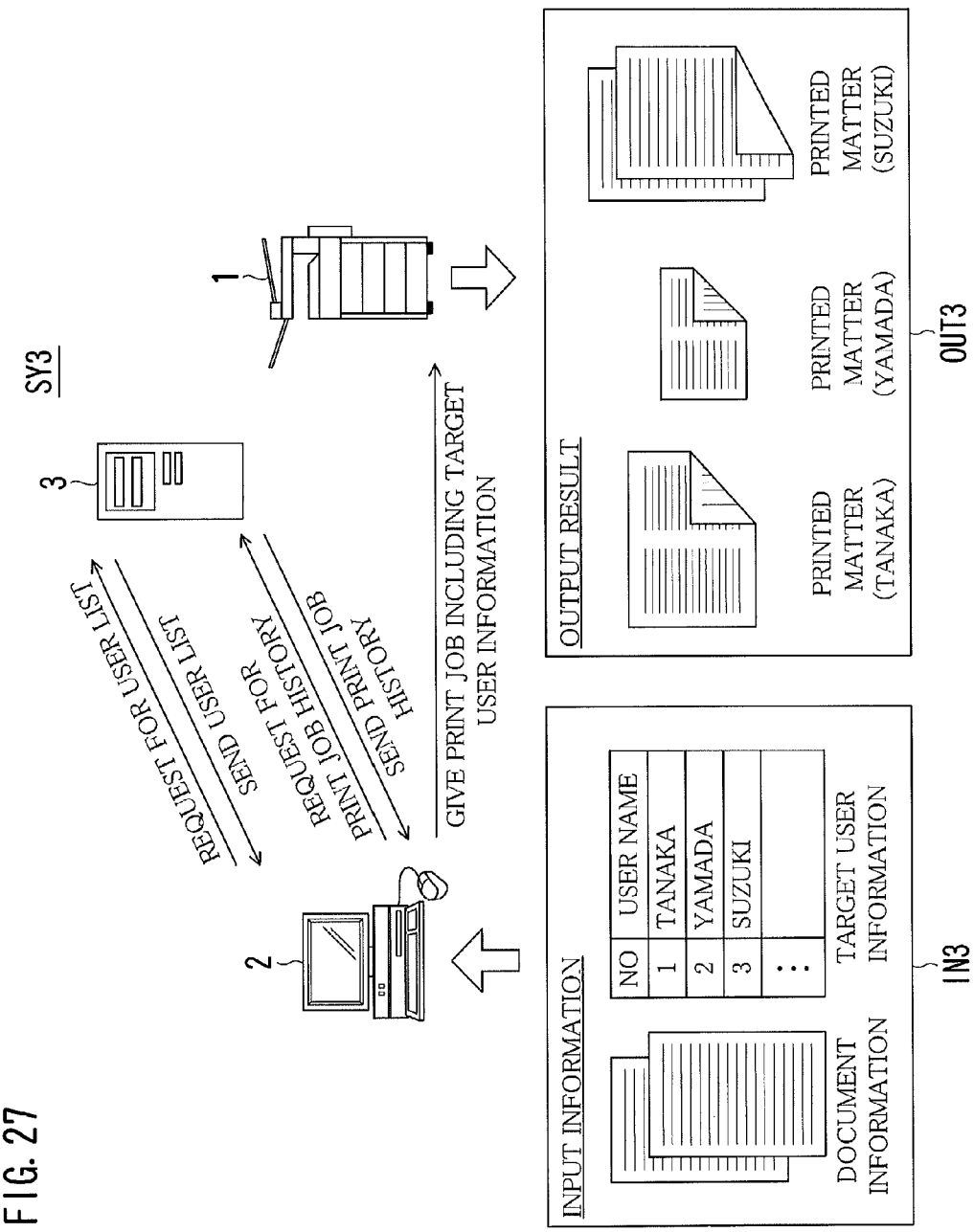
FIG. 27 is a schematic diagram showing an example of data sent and received between devices constituting a printing system.

Referring to FIG. 27, as with the case of the first embodiment, the print requesting device 2 receives an input of document information indicating a print target, an input of target user information indicating recipients of printed matters, and so on (IN3), and the printing device 1 outputs a printed matter in accordance with a customized output format for each recipient user indicated in the target user information (OUT3). During the process, the authentication server 3 provides the print requesting device 2 with the user list and a print job history, and the print requesting device 2 gives a separate print job for each target user to the printing device 1.

In all the printing systems SY1 through SY3 of the first through third embodiments discussed above, it is possible to provide a printing device capable of printing a document based on an output format reflecting reader's own preference without putting a burden on the reader. To be specific, according to the printing systems SY1 through SY3, when a user intends to output printed matters reflecting output formats according to individual readers' personal preferences, such output formats are determined based on a history of print jobs that were executed for the corresponding reader. This eliminates the need for each reader to register in advance his/her preferred output format, which results in saving him/her from a burdensome task.

In the embodiments discussed above, the hardware configuration and the functional configuration of the printing device 1, the print requesting device 2, the authentication server 3, and the like may be altered as required in accordance with the subject matter of the present invention. Further, the content to be processed, the processing sequence, and the like of the printing device 1, the print requesting device 2, the authentication server 3, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A printing device for printing a document, to be passed to one or more recipients being different from a user who has given a command to perform printing, in an output format for each of the recipients, the printing device comprising:
   a receiving portion configured to accept a print job indicating the document and the recipients;
   a first determination portion configured to determine, for each of the recipients, whether or not a history of print jobs that were executed based on a command by said each of the recipients is present;
   a second determination portion configured to determine an output format for each of the recipients indicated in the accepted print job; and
   a print job execution portion configured to, when printing the document indicated in the accepted print job by a plurality of sets corresponding to a number of the recipients, perform the printing in the output format for each of the recipients determined by the second determination portion;
   wherein:
   as for the recipient for which the first determination portion determines that a history of print jobs is present, the second determination portion determines the output format for each of the recipients based on the history of print jobs; and
   as for the recipient for which the first determination portion determines that a history of print jobs is not present, the second determination portion determines that an output format designated by the user who has given a command to execute the print job indicating the recipients to the printing device is the output format for each of the recipients.

2. The printing device according to claim 1, wherein:
   the receiving portion accepts, as the print job, print job data describing recipient information indicating the recipients, and
   the second determination portion determines an output format based on a history of jobs that were executed in response to a command by said each of the recipients indicated in the recipient information.

3. A printing system for printing a document, to be passed to one or more recipients, in an output format for each of the recipients, the one or more recipients being different from a user who has given a command to perform printing, the printing system comprising:
   a print requesting device configured to request a printing process; and
   a printing device configured to execute the printing process in response to the request; wherein
   the print requesting device includes an issuance portion configured to give, to the printing device, a print job indicating the document and the recipients,
   the printing device includes
      a receiving portion configured to accept the print job given by the print requesting device,
      an obtaining portion configured to obtain a history of print jobs that were executed based on a command by said each of the recipients by the printing device,
      a first determination portion configured to determine, for each of the recipients, whether or not a history of print jobs that were executed based on a command by said each of the recipients is present;
      a second determination portion configured to determine an output format for each of the recipients indicated in the accepted print job, and
      a print job execution portion configured to, when printing the document indicated in the accepted print job by a plurality of sets corresponding to a number of the recipients, perform the printing in the output format for each of the recipients determined by the second determination portion;
   wherein:
   as for the recipient for which the first determination portion determines that a history of print jobs is present, the second determination portion determines the output format for each of the recipients based on the history of print jobs; and
   as for the recipient for which the first determination portion determines that a history of print jobs is not present, the second determination portion determines that an output format designated by the user who has given a command to execute the print job indicating the recipients to the printing device is the output format for each of the recipients.

4. The printing system according to claim 3, wherein
   the printing device further includes a creation portion configured to create, aside from the accepted print job, a separate print job for each of the recipients, the separate print job indicating the document and the output format for each of the recipients determined by the determination portion, and
   the print job execution portion prints the document in the output format for each of the recipients based on the separate print job for each of the recipients.

5. The printing system according to claim 3, wherein, when printing the document by a plurality of sets corresponding to the number of the recipients, the print job execution portion successively prints the plurality of sets of documents whose output formats are common to each other.

6. The printing system according to claim 3, wherein
   the recipients are indicated in the accepted print job in the order that the recipients are to be given the plurality of sets of documents, and
   when printing the document by a plurality of sets corresponding to the number of the recipients, the print job execution portion performs the printing in such a manner that the plurality of sets of documents are outputted in the order that the plurality of sets of documents are to be passed to the recipients.

7. The printing system according to claim 3, wherein the history of print jobs is managed by the printing device or another information processing device connectable to the printing device.

8. The printing system according to claim 3, wherein the second determination portion determines that a desired output format of each of the recipients registered in the printing device or another information processing device connectable to the printing device is deemed as an output format for the recipients.

9. The printing system according to claim 3, wherein:
   the receiving portion accepts, as the print job, print job data describing recipient information indicating the recipients, and
   the second determination portion determines an output format based on a history of jobs that were executed in response to a command by said each of the recipients indicated in the recipient information.

10. A printing system for printing a document, to be passed to one or more recipients, in an output format for each of the recipients, the one or more recipients being different from a user who has given a command to perform printing, the printing system comprising:
- a print requesting device configured to request a printing process; and
- a printing device configured to execute the printing process in response to the request; wherein
- the print requesting device includes
  - an obtaining portion configured to obtain a history of print jobs that were executed based on a command by said each of the recipients by the printing device,
  - a first determination portion configured to determine, for each of the recipients, whether or not a history of print jobs that were executed based on a command by said each of the recipients is present;
  - a second determination portion configured to determine an output format for each of the recipients, and
  - an issuance portion configured to give, to the printing device, a separate print job for each of the recipients, the separate print job indicating the document and the output format for each of the recipients determined by the second determination portion, and
- the printing device includes
  - a receiving portion configured to accept the separate print job for each of the recipients given by the print requesting device, and
  - a print job execution portion configured to print the document indicated in the accepted separate print job in the output format according to the personal preference of each of the recipients;
- wherein:
  - as for the recipient for which the first determination portion determines that a history of print jobs is present, the second determination portion determines the output format for each of the recipients based on the history of print jobs; and
  - as for the recipient for which the first determination portion determines that a history of print jobs is not present, the second determination portion determines that an output format designated by the user who has given a command to execute the print job indicating the recipients to the printing device is the output format for each of the recipients.

11. The printing system according to claim 10, wherein:
the receiving portion accepts, as the separate print jobs, print job data describing recipient information indicating the recipients, and
the second determination portion determines an output format based on a history of jobs that were executed in response to a command by said each of the recipients indicated in the recipient information.

12. A method for controlling a printing device for printing a document, to be passed to one or more recipients, in an output format for each of the recipients, the one or more recipients being different from a user who has given a command to perform printing, the method causing the printing device to implement processes comprising:
accepting a print job indicating the document and the recipients;
determining, for each of the recipients, whether or not a history of print jobs that were executed based on a command by said each of the recipients is present;
determining an output format for the recipients indicated in the accepted print job; and
performing, when printing the document indicated in the accepted print job by a plurality of sets corresponding to a number of the recipients, the printing in the output format for each of the recipients;
wherein:
as for the recipient for which it is determined that a history of print jobs is present, it is determined that the output format for each of the recipients based on the history of print jobs; and
as for the recipient for which it is determined that a history of print jobs is not present, it is determined that an output format designated by the user who has given a command to execute the print job indicating the recipients to the printing device is the output format for each of the recipients.

13. The method according to claim 12, wherein:
the accepting step accepts, as the print job, print job data describing recipient information indicating the recipients, and
the determination of an output format step determines an output format based on a history of jobs that were executed in response to a command by said each of the recipients indicated in the recipient information.

14. A non-transitory computer-readable storage medium storing thereon a computer program used for controlling a printing device for printing a document, to be passed to one or more recipients, in an output format according to a personal preference of each of the recipients, the one or more recipients being different from a user who has given a command to perform printing, the computer program causing the printing device to implement processes comprising:
accepting a print job indicating the document and the recipients;
determining, for each of the recipients, whether or not a history of print jobs that were executed based on a command by said each of the recipients is present;
determining an output format for the recipients indicated in the accepted print job; and
performing, when printing the document indicated in the accepted print job by a plurality of sets corresponding to a number of the recipients, the printing in the output format for each of the recipients;
wherein:
as for the recipient for which it is determined that a history of print jobs is present, it is determined that the output format for each of the recipients based on the history of print jobs; and
as for the recipient for which it is determined that a history of print jobs is not present, it is determined that an output format designated by the user who has given a command to execute the print job indicating the recipients to the printing device is the output format for each of the recipients.

15. The non-transitory computer-readable storage medium according to claim 14, wherein:
the accepting step accepts, as the print job, print job data describing recipient information indicating the recipients, and
the determination of an output format step determines an output format based on a history of jobs that were executed in response to a command by said each of the recipients indicated in the recipient information.

* * * * *